(12) United States Patent
Cyzs et al.

(10) Patent No.: US 10,924,141 B2
(45) Date of Patent: Feb. 16, 2021

(54) SYSTEMS AND METHODS FOR CANCELLATION OF PASSIVE INTERMODULATION (PIM) FOR A WIRELESS NETWORK RECEIVER

(71) Applicant: Ubiqam Ltd., Petach-Tikva (IL)

(72) Inventors: Baruch Cyzs, Kiryat-Motzkin (IL); Oren Amidan, Tzur-Yigal (IL); Amir Meir, Tel-Aviv (IL); Daniel Manor, Tel-Aviv (IL)

(73) Assignee: Ubiqam Ltd., Petach-Tikva (IL)

( * ) Notice: Subject to any disclaimer, the term of this patent is extended or adjusted under 35 U.S.C. 154(b) by 0 days.

(21) Appl. No.: 16/511,049

(22) Filed: Jul. 15, 2019

(65) Prior Publication Data

US 2020/0021323 A1 Jan. 16, 2020

Related U.S. Application Data

(60) Provisional application No. 62/698,169, filed on Jul. 15, 2018.

(51) Int. Cl.
*H04B 1/12* (2006.01)
*H04B 7/0413* (2017.01)
*H04B 1/10* (2006.01)
*H04B 1/525* (2015.01)

(52) U.S. Cl.
CPC ............... *H04B 1/123* (2013.01); *H04B 1/10* (2013.01); *H04B 1/1027* (2013.01); *H04B 1/525* (2013.01); *H04B 7/0413* (2013.01)

(58) Field of Classification Search
CPC ........ H04B 1/123; H04B 1/10; H04B 7/0413; H04B 1/1027; H04B 1/525; H04B 1/109; H04B 1/0475; H04J 11/0023
USPC ......................................................... 375/346
See application file for complete search history.

(56) References Cited

U.S. PATENT DOCUMENTS

2018/0351588 A1* 12/2018 Ohta ..................... H04B 1/0475
2019/0363750 A1* 11/2019 Lai ......................... H04B 1/123

* cited by examiner

*Primary Examiner* — Leila Malek

(57) ABSTRACT

There is provided a passive intermodulation (PIM) mitigation module for mitigating PIM within a receiver of a wireless network, the PIM mitigation module comprising: at least one processor executing a code for: receiving transmit signals transmitted by at least one transmission source, receiving received signals received by at least one reception source, computing a plurality of synthetic PIM signals from the transmit signals, wherein each of the plurality of synthetic PIM signals is a respective combination of a plurality of frequency components of the transmit signals, computing a plurality of mitigation weights for mitigating the plurality of synthetic PIM signals, and performing a PIM mitigation process on the received signal with the plurality of mitigation weights to generate clean signals to provide to the receiver.

19 Claims, 17 Drawing Sheets

SYSTEMS AND METHODS FOR CANCELLATION OF PASSIVE INTERMODULATION (PIM) FOR A WIRELESS NETWORK RECEIVER

RELATED APPLICATION

This application claims the benefit of priority under 35 USC § 119(e) from U.S. Provisional Patent Application No. 62/698,169 filed on Jul. 15, 2018, the contents of which are incorporated herein by reference in their entirety.

FIELD AND BACKGROUND OF THE INVENTION

The present invention, in some embodiments thereof, relates to wireless data communication systems and, more specifically, but not exclusively, to systems and methods for mitigation of passive intermodulation (PIM).

PIM is a form of interference in communication systems, in particular, wireless communication systems.

Passive intermodulation may occur when single or several radiofrequency (RF) emitted signals are reflected from metallic objects that have some non-linear characteristics resulting in nonlinear product of the emitted signal or signals. The emitted signal or signals are present in a passive non-linear device or element. The emitted signals may mix or multiply with each other to generate other product signal or signals in different frequencies that may interfere with a collocated receiver that is tuned to these product signals frequencies.

The nature of PIM is that it occurs in elements that would otherwise be expected to operate in a linear fashion. Typically, any mixing or multiplication of signals in diode components in circuits is not termed PIM as the mixing is generally desired and the diodes are expected to be in place. On the contrary PIM is normally a result of the spurious generation of non-linearities—typically it may occur in connectors, switches, isolators and the like. Another PIM generating source is oxidation of metallic materials in vicinity of transmitting antennas typically found in roof-top, cellular tower, and poles installations. Furthermore, the PIM can be part of the reflection of the wireless channel due to some rusty metal reflectors in the transmit-receive path.

The PIM products caused by the non-linearity follow the same principles of those of wanted modulation products in a mixer. It is found that the various harmonics of the emitted signal frequencies mix together to form products that can remain within the required operational band or in another operating band of collocated receiver.

SUMMARY OF THE INVENTION

According to a first aspect, a passive intermodulation (PIM) mitigation module for mitigating PIM within a receiver of a wireless network, comprises: at least one processor executing a code for: receiving transmit signals transmitted by at least one transmission source, receiving received signals received by at least one reception source, computing a plurality of synthetic PIM signals from the transmit signals, wherein each of the plurality of synthetic PIM signals is a respective combination of a plurality of frequency components of the transmit signals, computing a plurality of mitigation weights for mitigating the plurality of synthetic PIM signals, and performing a PIM mitigation process on the received signal with the plurality of mitigation weights to generate clean signals to provide to the receiver.

According to a second aspect, a method of mitigating PIM within a receiver of a wireless network, comprises: receiving transmit signals transmitted by at least one transmission source, receiving received signals received by at least one reception source, computing a plurality of synthetic PIM signals from the transmit signals, wherein each of the plurality of synthetic PIM signals is a respective combination of a plurality of frequency components of the transmit signals, computing a plurality of mitigation weights for mitigating the plurality of synthetic PIM signals, and performing a PIM mitigation process on the received signal with the plurality of mitigation weights to generate clean signals to provide to the receiver.

According to a third aspect, a computer program product for mitigating PIM within a receiver of a wireless network, comprises: a non-transitory memory having stored thereon a code for execution by at least one hardware processor adapted to execute the code for: receiving transmit signals transmitted by at least one transmission source, receiving received signals received by at least one reception source, computing a plurality of synthetic PIM signals from the transmit signals, wherein each of the plurality of synthetic PIM signals is a respective combination of a plurality of frequency components of the transmit signals, computing a plurality of mitigation weights for mitigating the plurality of synthetic PIM signals, and performing a PIM mitigation process on the received signal with the plurality of mitigation weights to generate clean signals to provide to the receiver.

In a further implementation of the first, second, and third aspects, the plurality of frequency components of the transmit signals used to generate the respective combination are predicted to produce a respective PIM signal in a corresponding frequency component of the received signals.

In a further implementation of the first, second, and third aspects, the plurality of synthetic PIM signals are computed by combinations of frequency bands selected from a plurality of the at least one transmission source denoting a predicted reflection of the transmit signals off at least one non-linear PIM reflection element that is received by the at least one reception source.

In a further implementation of the first, second, and third aspects, the received signals are divided into a plurality of frequency bins each predicted to include no more than a PIM product generated from a single PIM reflection element, at least one synthetic PIM signal is computed for each group of frequency bins of the transmitted signals corresponding to the respective frequency bin of the received signals, at least one mitigation weight is computed for each received frequency bin, and the PIM mitigation process is computed for each received frequency bin of the plurality of reception sources from frequency bins groups of the transmitted signals with plurality of the transmission sources, wherein each synthetic PIM that corresponds to single transmission frequency bin group of a certain length denoted N corresponding to up to N transmission sources out of the plurality of transmission sources produces a single weight for mitigating the respective received PIM in one receiving source out of the plurality of receiving sources.

In a further implementation of the first, second, and third aspects, the plurality of synthetic PIM signals are computed by converting the transmit signals from a time domain to a frequency domain, and wherein for each respective receiving frequency domain bin of the received signals of width of the desired signal bandwidth divided by a number of receiving bins that corresponds to one of the reception sources denoted NoRxBin, wherein PimOrder denotes an order of PIM for mitigation by the PIM mitigation process, the synthetic PIM signals are computed as combinations of transmission frequency domain bins of the transmitted signals with bandwidth of the desired signal divided by a multiple of the number of Rx bins and PIM order denoted by the equation PimOrder*NoRxBin that corresponds to up to PimOrder transmission reception sources that are predicted to produce PIM in the corresponding frequency domain bins of the received signals.

In a further implementation of the first, second, and third aspects, further comprising shifting each of the plurality of synthetic PIM signals to an expected center frequency position, wherein the frequency shift is set according to the synthetic PIM signals that have expected center frequency equal to a certain receiving frequency bin center, the amount of frequency shift is set such that the center of bins of the synthetic PIM signal is equal to the center of the receiving bin.

In a further implementation of the first, second, and third aspects, the received signals include PIM products created from the transmit signals from the plurality of transmission sources.

In a further implementation of the first, second, and third aspects, PIM products in the received signals are created from a plurality of PIM reflection elements, and the PIM mitigation process is performed on the received signal when a frequency bandwidth of the received signals is lower enough compared to an inverse of maximum difference in delay difference between a closest and a furthest of the plurality of PIM reflection elements.

In a further implementation of the first, second, and third aspects, further comprising, prior to the performing the PIM mitigation process, aligning time and frequency of the synthetic PIM signals and relative to the received signals.

In a further implementation of the first, second, and third aspects, the at least one reception source and the at least one transmission source operate simultaneously using same and/or co-located antennas, and a PIM product frequency is substantially equal to the frequency of the received signals.

In a further implementation of the first, second, and third aspects, the received signal include PIM created from components of hardware of the at least one reception source.

In a further implementation of the first, second, and third aspects, the received signals include PIM created from a nonlinear reflecting object in a transmission path of the transmit signals that is reflected to the plurality of reception sources and included in the received signals.

In a further implementation of the first, second, and third aspects, further comprising computing and providing an indication of at least one member of the group consisting of: order of PIM interference, frequency of the PIM generating transmitter, and a certain emitting antenna generating PIM n a certain receiver interfered antenna.

In a further implementation of the first, second, and third aspects, the PIM in the received signals is created from a plurality of carriers transmitted from a single antenna.

In a further implementation of the first, second, and third aspects, a third order PIM is included in the received signals when two transmit carriers and two multiple-input and multiple-output (MIMO) antennas are implemented.

In a further implementation of the first, second, and third aspects, frequency bins of the plurality of synthetic PIM signals computed from frequency bins of the transmitted signals overlap completely with the frequency bins of the received signals.

In a further implementation of the first, second, and third aspects, a plurality of frequency bins of the plurality of synthetic PIM signals overlap a same frequency bin of the received signals.

In a further implementation of the first, second, and third aspects, at least two mitigation weights are computed for the same frequency bin of the received signals corresponding to the overlapping plurality of synthetic PIM signals.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DESCRIPTION OF SPECIFIC EMBODIMENTS OF THE INVENTION

Figure 1:
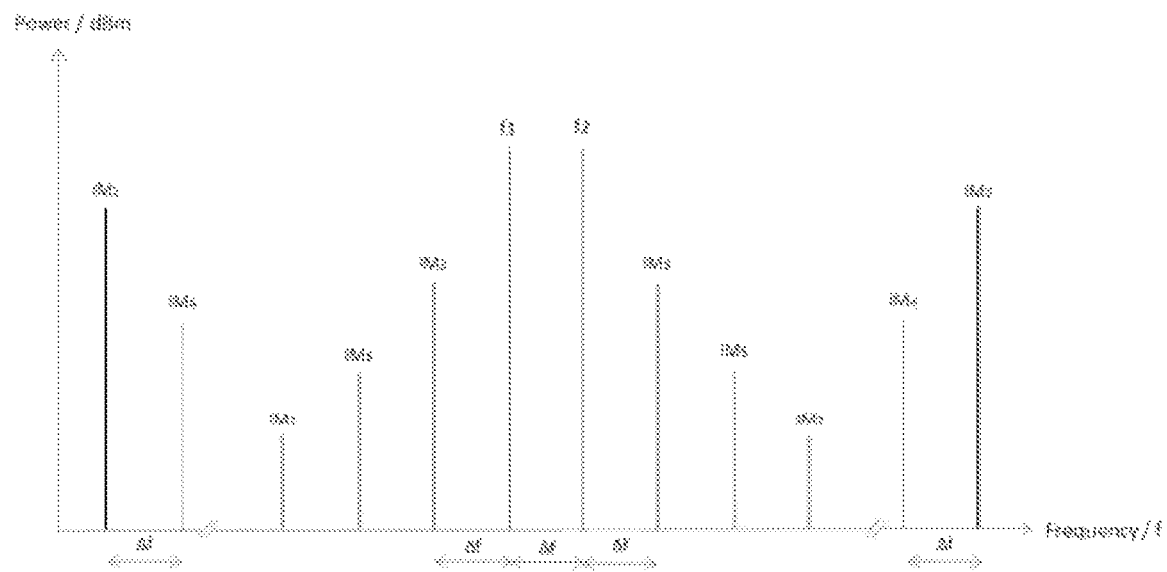
FIG. 1 is a graph of an exemplary frequency spectrum of PIM non linearities, in accordance with some embodiments of the present invention.

The present invention, in some embodiments thereof, relates to wireless data communication systems and, more specifically, but not exclusively, to systems and methods for mitigation of passive intermodulation (PIM).

As used herein, term mitigating (e.g., PIM mitigation) may be interchanged with the term cancellation (e.g., PIM cancellation).

As used herein, the term PIM may refer to PIM interference.

As used herein, the term mitigation and cancellation may sometimes be interchanged. For example, the term PIM cancellation and PIM mitigation may sometimes be interchanged.

As used herein, the term module may sometimes be interchanged with the term component.

As used herein, the phrase PIM mitigation may refer to removal and/or reduction of PIM signals (sometimes referred to as PIM interference) from received signals. Desired signals may be isolated. Mitigation and/or removal may not be complete. Noise and/or the undesired signals may remain at a reduced level that allows for identification and/or detection of the desired signal. The PIM mitigation may reduce the level of interference, for example, below a predefined receiver noise threshold level. A corrupted signal (composed from desired signals with interference from PIM signals) may undergo PIM mitigation to generate a clean signal (composed from desired signals).

As used herein, the term PIM mitigation may refer to one or more (e.g., all) of the following: the process of computing synthetic PIM signals from the transmit signals, and the process of cleaning the received signals with the mitigation weights computed for mitigating the synthetic PIM signals. The PIM mitigation process may sometimes refer to additional features that may be performed by other components, for example, obtaining the transmit signals, obtaining the received signals, and computing the mitigation weights, as described herein.

As used herein, the term PIM mitigation may refer to one or more (e.g., all) of the following: the PIM mitigation module described herein, the method for performing PIM mitigation as described herein, code stored in a memory that when executed by one or more hardware processors causes the hardware processor(s) to perform the PIM mitigation process as described herein, an apparatus designed to perform PIM mitigation as described herein, and/or a system designed to perform PIM mitigation as described herein. The cited terms for referring to PIM mitigation may sometimes be substituted for one another, and/or one term may serve as an example of one implementation while referring to other possible implementations.

As used herein, the term antenna sometimes means the port of the antenna.

An aspect of some embodiments of the present invention relates to a module and/or component and/or system, and/or apparatus, and/or method, and/or code instructions (i.e., stored in a memory for execution by hardware processor(s)) for mitigation of PIM interference within received signals received by reception source(s) of a wireless network. The PIM interference is removed or reduced to obtain the desired signals of the received signals. The PIM may be mitigated within a receiver of a wireless network that may have co-located and/or nearby transmitters and receivers, for example, a base station of a cellular network. Transmit signals transmitted by transmission sources(s) (e.g., antenna(s) of a wireless network) are received. Received signals received by reception source(s) (e.g., antenna(s) of a wireless network) are received. The received signals may include desired signals mixed with PIM interference signals resulting from reflection of the transmit signals off one or more non-linear PIM reflection elements (e.g., passive metallic objects) into the reception source. Synthetic PIM signals are computed from the transmit signals. The synthetic PIM signals represent different predictions of candidate PIM interferences that may be caused (and/or may be present) in the received signals from the transmitted signals reflecting off one or more non-linear PIM reflection elements into the reception source(s). The synthetic PIM signals may be generated to cover all (or the most significant) cases of possible PIM interference that may actually be present in the received signals due to the transmit signals reflecting off one or more non-linear PIM reflection elements and being receiving by the reception sources. Mitigation weights are computed for mitigating the synthetic PIM signals. A PIM mitigation process is performed on the received signals using the mitigation weights to generate clean signals. The clean signals may be provided to the receiver of the wireless network.

It is noted that the desired signals within the received signals may originate from an external transmitter that is different than the transmitter transmitting the signals that are reflected of the non-linear PIM reflection elements resulting in the PIM interference which is mixed with the desired signals in the received signals. The transmitter transmitting the signals that result in PIM may be co-located (e.g., same tower, same base station) as the receiver. The transmitter transmitting the desired signals may be located remotely, in a different geographically distant tower and/or base station than the receiver.

Each synthetic PIM signal is computed according to a respective combination of frequency components of the transmit signals. When multiple transmission sources are implemented, at least some synthetic PIM signals are a combination of one or more frequency bins from two or more of the transmission sources, for example, two frequency bands from one antenna and a single frequency band from another antenna. The frequency components of the transmit signals used to generate the respective combination may be selected according to a prediction of producing a respective PIM signal in a corresponding frequency component of the received signals.

When computations are performed in the frequency domain, each frequency bin of the received signals may correspond to two or more frequency bins of two or more synthetic PIM signals. Each frequency bin of the received signals may be overlapped by three or more synthetic PIM signals. The PIM mitigation process may be performed for each respective frequency bin of the received signals using the mitigation weights computed for all of the synthetic PIM signal bins that overlap the respective received signal frequency bin.

Optionally, the cancellation processes is fragmented into partial frequency sub-bands in which it is assumed that the PIM signal from a single diode is flat in phase and/or amplitude throughout the respective sub-band. In such case the partial sub-band PIM interference component (out of the entire PIM interfering signal) may be cancelled sufficiently by applying a single complex weight. The partial sub-band component of the single diode generated PIM signal may be referred to herein as a PIM signal bin. In case of multiple diodes that produce PIM interference signals, the aggregated PIM signal bin from multiple diodes is summed may be cancelled with some flat amplitude and/or phase weight when the bin frequency bandwidth is lower enough compared to the inverse of maximum difference in delay difference between the closest and the furthest diodes PIM signal reception.

Conceptually, the PIM cancellation process processes the transmit (Tx) signals that are candidates to produce PIM.

At least some implementations of the systems, apparatus, methods, and/or code instructions described herein improve the technology of interference removal in wireless communication systems. At least some implementations of the systems, apparatus, methods, and/or code instructions described herein may be implemented in a generic manner for many different types of wireless systems, without requiring identification of the particular PIM interference of the respective wireless system. The synthetic PIM signals are selected to cover all (or the most significant) PIM interference scenarios, and remove the PIM interference, without the technical challenge of detecting the PIM interference. The PIM interference may be removed without knowing what the PIM interference actually is. Detecting and removing PIM interference may be difficult using standard approaches, in particular when multiple antennas are used for transmission and reception (e.g., for multiple carriers) and PIM may result from a combination of multiple transmissions from multiple transmitters arriving at the receiver, which may generated PIM of high order, as described herein. Detecting PIM and removing PIM in such multi antenna networks using standard approaches may be technically difficult. In some implementations, the PIM interference may be automatically detected, and an indication of the PIM interference may be provided.

At least some implementations of the systems, apparatus, methods, and/or code instructions described herein address the technical problem of radio interference caused by PIM in wireless communication systems. At least some implementations of the systems, apparatus, methods, and/or code instructions described herein improve the technology of wireless communication by reducing and/or eliminating radio interference caused by PIM in wireless communication systems.

PIM caused by the non-linearity characteristics of radio frequency (RF) passive devices, such as non-linear rusty metal surface or non-linear magnetic hysteresis of ferromagnetic materials, may cause radio interference, which may significantly impact the quality of wireless transmission in wireless communication systems. In frequency division duplexing (FDD) systems, where the transmit and receive are performed simultaneous using the same and/or collocated antennas, PIM from the transmit system may cause PIM interference to the receive data signals when the PIM product frequency is equal to the receiving frequency. PIM may be due to components in the receiving HW itself like antennas, connectors, cables, and the like. PIM may be due to nonlinear reflecting object in the transmission path that is reflected to the receiver in the FDD receiving frequency through a nonlinear manner.

As used herein, nonlinear objects that produce PIM reflection are sometimes referred to as parasite diodes or diodes.

PIM presents a growing hazard to cellular networks. Cellular networks continue to evolve to further increase capacity demand. The path to 5G includes sites densification, more spectrum and massive multiple-input and multiple-output (MIMO). All these factors increase the hazards of PIM deteriorating the wireless network's performance. As more sites are deployed on roof-tops in urban areas the danger of external PIM is increasing due to the proximity of the site antennas to metallic material. Increase in spectrum implies greater likelihood of lower (2nd and 3rd) order strong intermodulations and harmonics of transmit signals to fall within the receive spectrum and impact severely receivers' noise-floor. Massive MIMO transmissions further increase the likelihood of destructive PIM as result of large number of transmitting elements.

The technical problem caused by PIM may be aggravated with the culminating technologies of wireless cellular networks such as cloud RAN (C-RAN) and virtual RAN (V-RAN). In C-RAN and V-RAN the baseband processing of multiple wireless cell-sites is collocated in single location that is referred as "hotel". At each cell-site several remote radio units (RRU) are deployed in several frequency bands. Each RRU can have multiple transmitters to implement transmit (Tx) multi input multi output (MIMO) schemes. The plurality of transmitters in very close location or in the same location creates potential to produce significant PIM interference signal that may hamper some collocated receivers that also are tuned to a plurality of frequencies that are different of the Tx frequencies.

The transmitted signal hits parasite diodes that produce PIM signal component due to their non-linearity behavior that may be reflected to the interfered receiver antenna. Since PIM producing usually requires relatively high power of the original signal it may be assumed that the parasite diodes are hit usually by a transmit signal in a line of site manner. The returned PIM signal can be combination of direct line of site (LOS) and reflection of this signal from another object (as multipath).

In at least some implementations, the PIM module described herein performs PIM removal, cleaning the uplink receive spectrum by utilizing frequency components of the PIM generating downlink transmit signals. In at least some implementations, the PIM module utilizes the (e.g., long term evolution (LTE)) downlink transmit signals on the (e.g., Common Public Radio Interface (CPRI)) interface to train the algorithms and perform optimal cancellation regardless of the number of PIM generating elements (e.g., diodes) at the site. Utilizing the downlink signal components provides superior mitigation of the LTE generated PIM in contrast to, for example, standard approaches that are based on "uplink only" processing tailored to remove non-LTE interferers. The PIM module achieves optimal cancellation levels restoring original pre-PIM noise-floor for best site performance.

In at least some implementations, the PIM module centralized processing architecture is based on having all transmit and receive signals related to the PIM interference processed at a central location. Multiple radios may be connected simultaneously and have their Downlink and Uplink signals processes. In at least some implementations, the architectural advantage results in the highest level of PIM removal at the most challenging massive MIMO scenarios In at least some implementations, the PIM module enables the operator to maintain optimum Downlink transmission power, thus eliminating the need for undesired transmit power reduction to lower uplink path PIM interference.

In at least some implementations, the PIM module results in significant improvement of key performance indicators (KPI), such as coverage, throughput, retainability and accessibility.

In at least some implementations, the PIM module may be extended to provide Spectral Intelligence and external interference insight.

In at least some implementations, the PIM module provides a complete suite of tools for the automation of radio access network (RAN) performance optimization processes and significant operating expense (OPEX) savings.

In at least some implementations, the PIM module enable tremendous saving by eliminating the Sisyphean and recurring process of manually hunting and remediating dozens of PIM generating elements at each cell-site.

In at least some implementations, the PIM mitigation device is seamlessly installed between up to 8 remote radio unit (RRU) and baseband unit (BBU) pairs.

In at least some implementations, the PIM module is a transparent add-on for any vendors' CPRI solution. Built-in Optical Line Protection (OLP) may ensure continuous operation under any failure, loss of power and SW remote upgrade. A cloud-based platform, may be used for management of the PIM module deployment. Remote view of spectral data and extracted Spectral Intelligence (SI) recorded by the deployed platforms may be provided.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

When one or more signals are combined and fed into an input of a nonlinear passive component (e.g., parasite diode), the nonlinearity may cause the signals to mix or multiply with each other creating new signal components that are related to the input ones. These new signals components are called harmonic frequencies and Intermodulation (IM) products. A two-tone measurement is often used for PIM testing. Two continuous wave (CW) signals at frequencies f1 and f2 with same power levels are applied into a device under test input port and the IM product is obtained from an output port.

Reference is now made to FIG. 1, which is a graph of an exemplary frequency spectrum of PIM non linearities, for example, the IM product outputted by an output port of a device in response to an input of two continuous wave signals at frequencies f1 and f2 with same power levels are inputted, in accordance with some embodiments of the present invention.

IM products may be referred to by their order, which is the number of times a product within the output is multiplied. The order number is associated with the maximum power value of the polynomial term that represents the non-linearity of the diodes in the reflection path. The PIM component may be a result of out-band spill-over signal of single Tx carrier (e.g., download (DL) part of FDD carrier), such PIM type may be referred to herein as self-created PIM. The other type of PIM is a result of mixing of two or more Tx carriers that produce the IM component, such PIM type may be referred to herein as combined-created PIM. The third order IM product (IM3) is usually the most critical one when the IM products is of combined-created. It may fall within the (receiver) Rx band of upload (UL) carrier (whether it is FDD coupled to one of the pertinent download (DL) carrier or not) if the band is broad enough and the tone spacing is narrow enough. IM5 and IM7 products can be harmful mostly in case of self-created PIM.

Even order IM products, which include for example, IM2, IM4, and IM6, and the like, usually interfere in case the Rx carrier is relatively away of the Tx carrier that produces the PIM. Harmonics are integer multiples of the original input signals. The input signal may be termed the fundamental frequency or the first harmonic frequency. The second harmonic signal has twice the frequency of the fundamental one and the third harmonics has three times and so on. In theory, a signal may have an infinite number of harmonics but typically the 2nd and the 3rd orders are of concern because higher harmonics typically fall outside the frequency range used by any device or system.

Odd order IMs, which include for example, IM3, IM5, IM7, and the like, are dominating IM products because they are the ones closest to the usable frequency band of an application. The IM product order tells how many times the product within the output is multiplied. Their power level can be expressed in terms of absolute power (dBm) or in relation to carrier power (dBc).

The formulas that describes the frequencies of IM products are as follows:

$$(M+N)\text{low} = M^*f1 \pm N^*f2$$

$$(M+N)\text{high} = M^*f2 \pm N^*f1$$

Where=integer≥2
N=M−1
(M+N), fIM(M+N)high=odd order IM frequencies
f1, f2=frequency of the tone input signals This means that the M value for IM3 equation is 2 and N value is 1. The same principle applies to IM5 where M=3 and N=2. Two formulas are needed because in a two-tone scenario IM product are generated on a frequency that is below the first tone (fIM low) and on a frequency above the second tone (fIM high).

As the level of tones rise, so does the level of IM products. It is found that the level of IM products rises faster than that of the tone in the diode output. The higher the order, the faster they rise. It can be described that a 1 decibel (dB) rise in the tone level raises the level of IM3 products by 3 dB and the level of IM5 products by 5 dB. The odd order IM Product may be modeled using a low-order polynomial, derived by means of Taylor series.

Figure 2:
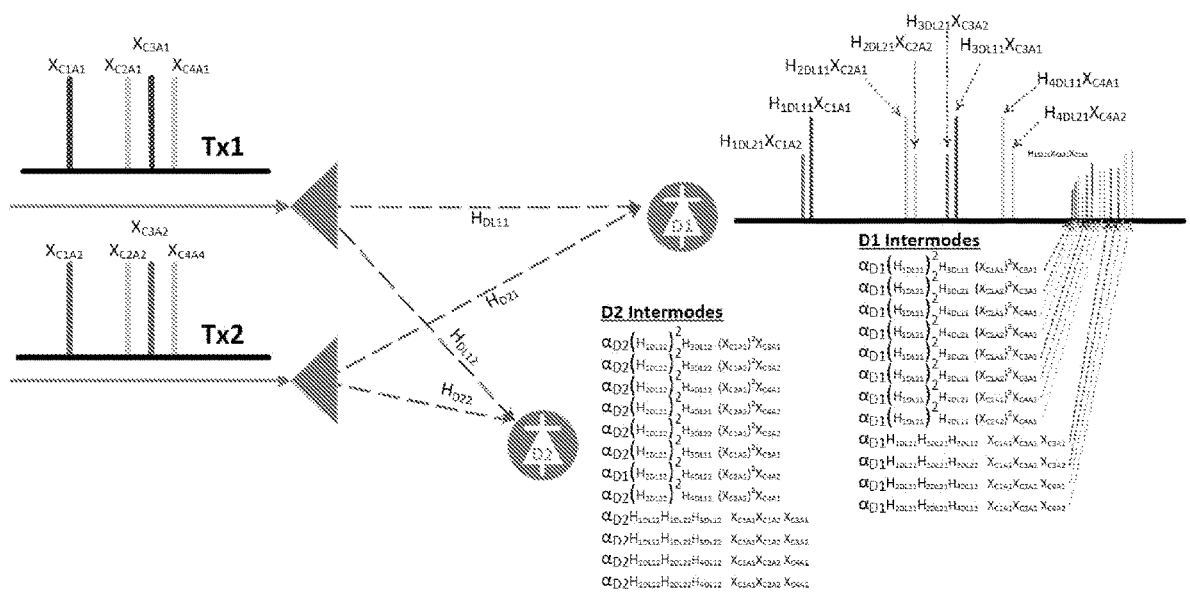
FIG. 2 is a schematic depicting an exemplary scenario that creates PIM, in accordance with some embodiments of the present invention.

Reference is now made to FIG. 2, which is a schematic depicting an exemplary scenario that creates PIM, in accordance with some embodiments of the present invention.

FIG. 2 depicts the case of 3rd order PIM with 2 Tx carriers (Tx1 and Tx2) and 2 MIMO antennas, the case of PIM that is produced by 2 carriers—the first 2 carriers out of the three are collocates the same FD location so only two are visible. In case of 3rd order PIM, each PIM receive bin is the product of 3 transmit bins.

The scenario depicted in FIG. 2 is based on two signals that are transmitted in 2 MIMO antennas and 'hit' two parasitic diodes (D1 and D2) that are located near the antennas. Two pairs of bins in both signals are followed (each in one of them) that produce an intermod (i.e., PIM interference) bin in common frequency value in the receive frequency. The two transmit pairs produces common bin intermod in one frequency domain location in the receive band of third carrier. The scenario illustrates how several PIM bins may be collocated in the frequency domain.

XC1A1 XC2A1 denote 2 bins of two Tx carrier in antenna 1 that produce 3rd intermod bin in Rx band in A location.

XC3A1 XC4A1 denote another 2 bins of two Tx carrier in antenna 1 that produce 3rd intermod bin in Rx band in A location.

XC1A2 XC2A2 denote 2 bins of two Tx carrier in antenna 2 that produce 3rd intermod bin in Rx band in A location.

XC3A2 XC4A2 denote other 2 bins of Tx carrier in antenna 2 that produce 3rd intermod bin in H1DLmn-Channel from DL base station antenna number m to parasite diode number n in frequency bin 1.

αDm denotes a third order factor of diode number m.

As can be seen in FIG. 2, each diode produces in each bin locations 12 collocated bins. The following labels denote the terms of all intermod bins that produced by diode 1:

αD1(H1DL11)2H3DL11 (XC1A1)2XC3A—intermod as a result of carrier 1 and carrier 3 both in the antenna 1.

αD1(H1DL21)2H3DL21 (XC1A2)2XC3A2—intermod as a result of carrier 1 in antenna 1 and carrier 3 in antenna 2.

αD1(H2DL11)2H4DL11 (XC2A1)2XC4A1—intermod as a result of carrier 1 and carrier 4 both in antenna 1.

αD1(H2DL21)2H4DL21 (XC2A2)2XC4A2 2XC4A1—intermod as a result of carrier 2 and carrier 4 both in antenna 1.

αD1(H1DL11)2H3DL21 (XC1A1)2XC3A2—intermod as a result of carrier 1 in antenna land carrier 3 in antenna 2.

αD1(H1DL21)2H3DL11 (XC1A2)2XC3A1—intermod as a result of carrier 1 in antenna 2 and carrier 3 in antenna 1.

αD1(H2DL11)2H4DL21 (XC2A1)2XC4A2—intermod as a result of carrier 2 in antenna 1 and carrier 4 in antenna 2

αD1(H2DL21)2H4DL11 (XC2A2)2XC4A1—intermod as a result of carrier 2 in antenna 2 and carrier 4 in antenna 1.

αD1H1DL11H1DL21H3DL11 XC1A1XC1A2 XC3-A1—intermod as a result of carrier 1 in antenna 1 and 2 and carrier 3 in antenna 1.

αD1H1DL11H1DL21H3DL21 XC1A1XC1A2 XC3-A2—intermod as a result of carrier 1 in antenna 1 and 2 and carrier 3 in antenna 2.

αD1H2DL11H2DL21H4DL11 XC2A1XC2A2 XC4-A1—intermod as a result of carrier 2 in antenna 1 and 2 and carrier 4 in antenna 1. αD1H2DL11H2DL21H4DL11 XC2A1XC2A2 XC4A2—intermod as a result of carrier 2 in antenna 1 and 2 and carrier 4 in antenna 2.

Figure 3:
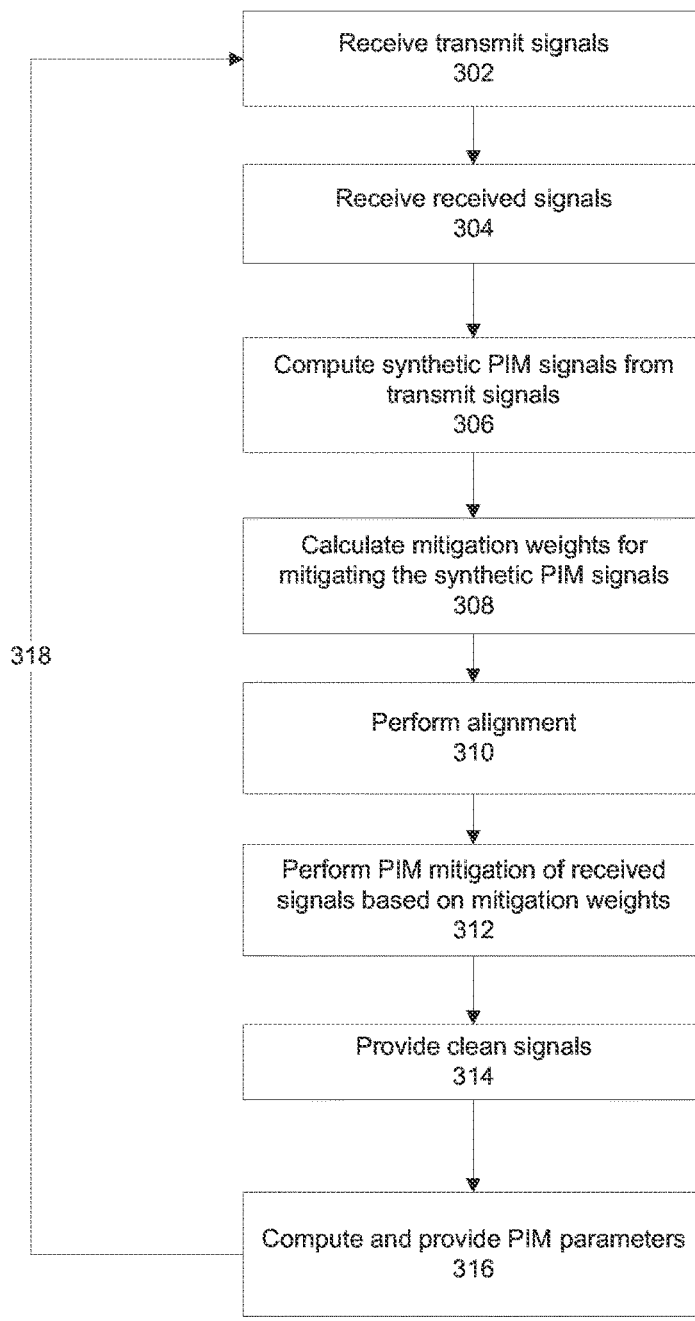
FIG. 3 is a flowchart of a method for mitigating PIM in received signals using synthetic PIM signals computed from transmitted signals, in accordance with some embodiments of the present invention.
Figure 4:
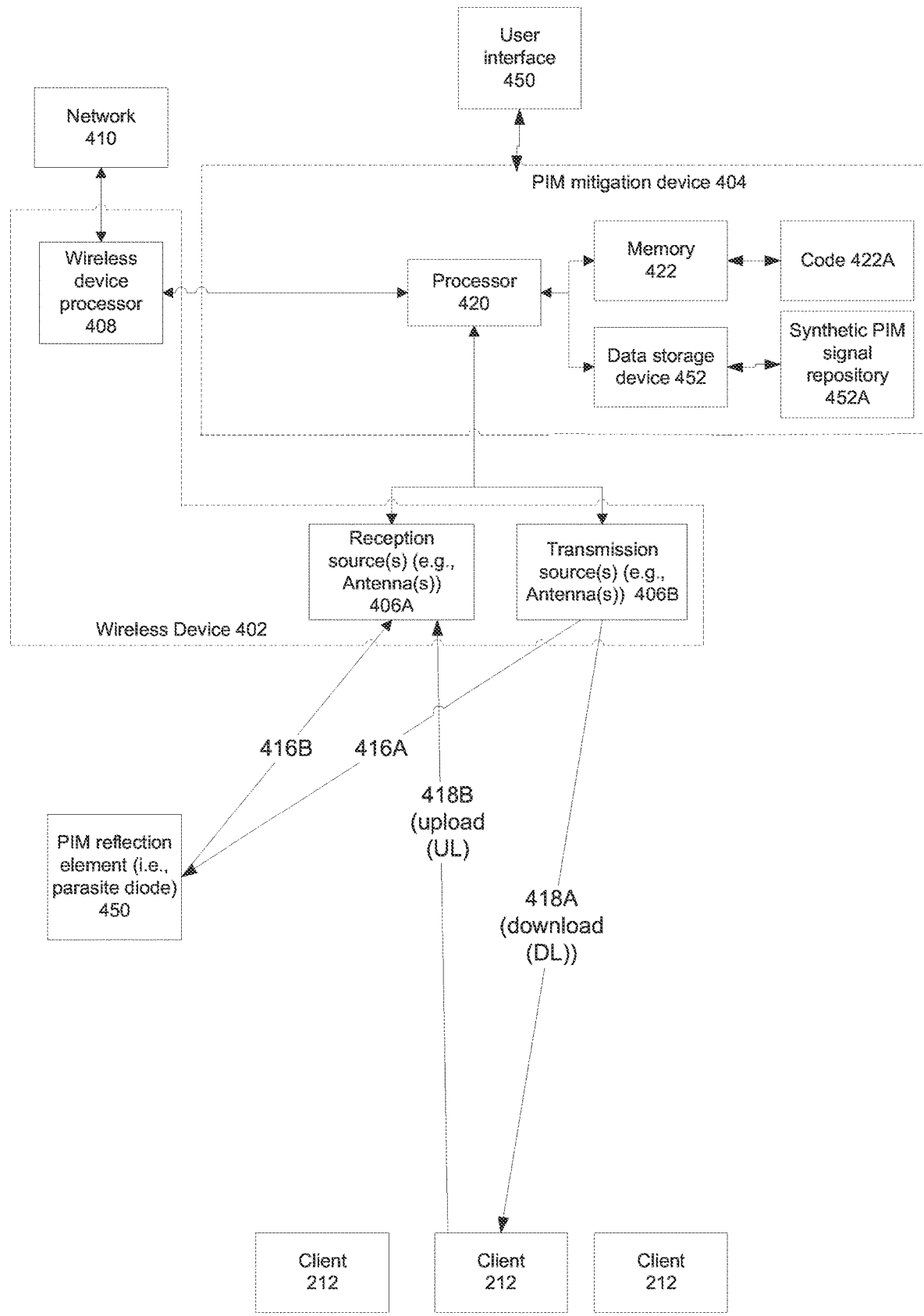
FIG. 4 is a block diagram of a wireless device for mitigating PIM interference signals using synthetic PIM signals computed from transmitted signals, in accordance with some embodiments of the present invention.

Reference is now made to FIG. 3, which is a flowchart of a method for mitigating PIM in received signals using synthetic PIM signals computed from transmitted signals, in accordance with some embodiments of the present invention. Reference is also made to FIG. 4, which is a block diagram of a wireless device 402 (sometimes referred to herein as receiver) that receives and transmits wireless signals, coupled to a PIM mitigation device (e.g., module and/or component) 404 for mitigating PIM interference signals in the received signals using synthetic PIM signals computed from transmitted signals, in accordance with some embodiments of the present invention.

PIM mitigation device 404 may be located within the wireless device 402. Alternatively or additionally, PIM mitigation device 404 is located remotely from wireless device 202.

Optionally, PIM mitigation device 404 has a receiver interface for electrically coupling (e.g., by plugging of a cable) to one or more reception sources (e.g., antenna(s)) 406A, and a transmitter interface for electrically coupling (e.g., by plugging of a cable) to one or more transmission sources (e.g., antenna(s)) 40BA. Optionally, device 404 has another interface for electrically coupling (e.g., by plugging in a cable) to wireless device 402 of a wireless communication network, which may connect to a network 410. Optionally, device 404 is an add-on device arranged as a self-contained structure for coupling to both the wireless network and the antennas.

It is noted that reception source(s) 406A and transmission source(s) 406B may be implemented as a single transceiver source(s), for example, one or more antennas.

Optionally, multiple reception sources 406A and multiple transmission sources 406B are fed into a single PIM mitigation device 404.

It is noted that FIG. 4 is a simplified high level conceptual diagram. Additional implementation designs and/or details are described herein, for example, with reference to other figures.

Installation of PIM mitigation device 404 may improve performance of wireless device 402 by adding additional PIM mitigation functionality in addition to any existing interference mitigation functions, for example, an existing antenna receiver diversity functionality.

PIM mitigation device 404 may be operated transparently, without coordination with the protected receivers 406A and PIM generating transmitters 406B. Alternatively, PIM mitigation device 404 may be may be operated in coordination with the protected receiver 406A or PIM generating transmitters 406B or with both 406A-B. Such coordination may include for example transmission by the PIM generating transmitter 406B of a known pattern training signal in time and or in frequency, muting or any other coordinating mechanism which may assist with the PIM mitigation process.

PIM mitigation device 404 may be implemented as integral part of wireless device 402 and/or a separate add-on functional module. In one implementation, the received and/or transmit signals are obtained as RF signals. In another implementation, the received and/or transmit signals are accessed in a digital baseband form.

PIM mitigation device 404 may be designed as a centralized architecture where relevant PIM contributing transmit signals and relevant PIM interfered receive signals are accessible by the PIM mitigation device 404.

Optionally, wireless device(s) 402 is implemented as a cellular base station, access point receivers, or other components within a data communication network, for example, a wireless and/or cellular data communication network. Wireless devices 402 may be part of any suitable wireless network, for example, wideband code division multiple access (WCDMA), LTE, WiFi, point-to-point communication, satellite communication, WiMax, cloud RAN (C-RAN) and virtual RAN (V-RAN), 5G, or other technologies.

Optionally, reception source(s) 406A and transmission source(s) 406B of wireless device 402 are co-located, such that signals transmitted by transmission source(s) 406B may create a PIM product within a receive signal frequency range of reception source(s) 406A. In C-RAN and V-RAN the baseband processing of multiple wireless cell-sites is co-located in a single location that is referred as "hotel". At each cell-site several remote radio units (RRU) are deployed in several frequency bands. Each RRU can have multiple transmitters to implement Tx MIMO schemes. The plurality of transmitters in very close location or in the same location creates potential to produce significant PIM interference signal that may hamper some collocated receivers that also are tuned to plurality of frequencies that are different of the Tx frequencies.

Wireless device(s) 402 may include transmission source(s) 406B (e.g., antennas) to transmit wireless signals 418A (also referred to herein as download (DL)) to one or more client terminals 212). Wireless devices 402 may include reception sources 406A (e.g., antennas) to receive wireless signals 418B (also referred to herein as upload (UL)) transmitted from one or more clients 412, for example, mobile phones, Smartphones, laptops, tablets, mobile devices, other receiving devices, and/or other transceivers. The received signals may be processed by a wireless processor 408, which is optionally connected to a data communication network 410. The processed received signals may be forwarded over network 410.

Wireless devices 402 may operate within licensed frequency bands, and/or may operate within unlicensed spectrums.

It is noted that only a reception source 406A and a single transmission source 406B are shown as an example for clarity and simplicity. It is understood that more than two source (e.g., antennas) may be used for transmission and/or reception, for example, 3, 4, 5, 6, 7, 8, or greater, for example, in MIMO architectures.

PIM interference in received signals outputted by reception source(s) 406A may be caused by a non-linear PIM reflection element(s) 450 having non-linear characteristics, as described herein, (also referred to herein as a parasite diode, or diode) that reflects transmitted signals 416A outputted by transmission source(s) 406B into 416B reception source(s) 406B. PIM reflection element(s) 450 may include, for example, components of the hardware of reception source(s) 406B, a non-linear reflecting object in the path of the transmit signals, and/or other examples as described herein.

PIM mitigation device 404 is in electrical communication with wireless device 402, via an interface, for example, cables, wireless connectors, cards that plug into slots, local busses and/or integrated therein.

Different installations may be performed, for example, depending on the implementation of wireless device 402 (e.g., base-station, access point). PIM mitigation device 404 may be a standalone device (e.g., connected by cables), embedded into wireless device 402 (e.g., card inserted into slot of wireless processor 408), and/or software (e.g., loaded onto a memory of wireless device 402 for execution by processor 408).

The Tx and Rx processing may be done through RF reception and analog to digital sampling or in case of split-mounted base station that use fiber optic between the mounts, through digital optical baseband sampling from the optical link between the baseband unit of the base station (BBU) to the remote RF unit of the base station (RRU). There are several optical link standards available for split-mount base stations such as Common Public Radio Interface (CPRI) or Open Base Station Architecture Initiative (OBSAI) or any other suitable communication protocol.

The structure of PIM mitigation device 404 may be based on the desired installation configuration. For example, the standalone device may contain one or more hardware processors 420, and a non-transitory memory 422 storing code 422A for execution by hardware processor(s) 420. The standalone device may be encased in a housing. The embedded configuration may not have the housing, with the processor 420 and memory 422 on a card. The software version may comprise of a computer program product having instructions for execution by a processor of the network, for example, the wireless processor 408. Alternatively or additionally, PIM mitigation device 404 is implemented (entirely or in part) based on firmware of programmable hardware devices, for example, field-programmable gate array (FPGA), application-specific integrated circuit (ASIC), or other hardware.

Optionally, PIM mitigation device 204 is connected along the received signal path from reception source(s) 406A to processor 408 and/or along the transmit signal path from processor 408 to transmission source(s) 406B (e.g., baseband receiver), between antennas 406A-B and processor 408 (e.g., baseband receiver). For example, PIM mitigation device 404 is connected in front of a RF receiving section of a base station, or in front of digital receiver baseband ports. In another example, interference mitigation device 404 is embedded into a baseband component.

Optionally, one or more filtering and/or amplification elements (e.g., hardware and/or software) are positioned in electrical communication between antennas 406A-B and PIM mitigation device 404. Alternatively or additionally, one or more filtering and/or amplification elements are positioned in electrical communication between PIM mitigation device 404 and processor 408. Examples of filters include duplexers. Examples of amplifiers include tower mounted amplifiers.

Hardware processor(s) 420 of PIM mitigation module 404 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 420 may include a single processor, or multiple processors (homogenous or heterogeneous) arranged for parallel processing, as clusters and/or as one or more multi core processing devices.

Memory 422 stores code instructions executable by hardware processor(s) 420, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 422 stores code 422A that implements one or more features and/or acts of the method described with reference to FIG. 3 when executed by hardware processor(s) 420. Alternatively or additionally, one or more instructions may be implemented in hardware, in processor(s) 420 and/or other hardware components, in addition to, and/or alternatively to code 422A.

One or more features described with reference to other figures described herein may be implemented in hardware and/or code 422A for execution by processor 420.

PIM mitigation device 404 may include data storage device(s) 452 for storing data, for example, synthetic PIM signal repository 452A that stores the computed synthetic PIM signals, as described herein. Data storage device(s) 452 may be implemented as, for example, a memory, a local hard-drive, virtual storage, a removable storage unit, an optical disk, a storage device, and/or as a remote server and/or computing cloud (e.g., accessed using a network connection).

Wireless device 402 may communicate with network 410, for example, the internet, a broadcast network, a local area network, a virtual network, a wireless network, a cellular network, a local bus, a point to point link (e.g., wired), and/or combinations of the aforementioned.

PIM mitigation device 404 may include and/or be in communication with one or more physical user interfaces 450 that include a mechanism for user interaction, for example, to enter data (e.g., define reception and transmission sources) and/or view data (e.g., of detected and/or removed PIM interference). Exemplary physical user interfaces 450 include, for example, one or more of, a touchscreen, a display, gesture activation devices, a keyboard, a mouse, and voice activated software using speakers and microphone.

Reference is now made back to FIG. 3. At 302, transmit signals transmitted by transmission source(s) are received.

The received signals include PIM products created from the transmit signals from the transmission sources (e.g., antennas).

The obtained transmit signals may be radiofrequency (RF) signals and/or digital baseband signals.

At 304, received signals received by reception source(s) are received. The received signals include PIM interference (also referred to as PIM products, or intermods) generated from transmit signals and/or include desired signals. The PIM interference may be created from the transmitted signals reflecting off one or more PIM reflection elements (i.e., parasitic diodes) and being sensed by the reception sources, for example, as described herein.

For example in a single input single output (SISO) implementation, the PIM in the received signals is created from multiple carriers transmitted from a single antenna.

The obtained received signals may be radiofrequency (RF) signals and/or digital baseband signals.

PIM included in the received signals may be of higher orders as described herein, for example, a third order PIM is included in the received signals when two transmit carriers and two multiple-input and multiple-output (MIMO) antennas are implemented.

The transmit signals and received signals may be extracted as digital baseband signals. The digital baseband signals may be extracted, for example, by RF acquisition with complex envelope ADC (IQ) sampling and decimation and/or by extracting the IQ data from a baseband interface source.

Optionally, the PIM cancellation process described herein is performed in the frequency domain (FD) of the baseband signals. The signals may be produced, for example, by running a Window Overlap & Add (WOLA) filter. The WOLA filter may be done, for example, using the following acts:

Buffering serial time domain (TD) input data samples in sequence of 50% (e.g., about 50%) overlap of two adjacent buffers.

Multiply each buffer with a window function.

Performing Fast Fourier Transform (FFT) on the buffer to convert TD samples to FD samples.

Multiplying each of the FD samples in the FD buffer (FFT output) with cancellation coefficients. There may be multiple coefficients for each bin.

Performing inverse-FFT (IFFT) on the FD buffer to convert FD samples back to TD samples.

Adding every two consecutive TD buffers and streaming the buffer serially.

The following mathematical equation denotes the FD expression of TX carrier denoted as number i:

$$T_i = \sum_{n=0}^{n=Ni-1} t(n)\exp(j2\pi f_n)$$

$T_i$—Tx carrier No. i signal
$t(n)$—complex variable that related to bin n
n—number of FD bin index
$f_n$—real frequency of the bin (around center freq $f_c$)
N—no of FD bins (FFT order)
i—carrier index The following denotes the FD expression of the PIM bins that fall in the receiver inband bandwidth:

$$PIM_{RX} = \sum_{f_n \in RxBW} \text{pim\_bin}(n)\exp(j2\pi f_n)$$

$PIM_{Rx}$—bins of resulted PIM from all carriers that falls within the inband or the Rx carrier
pim_bin(n)—complex variable that related to bin n of resulted PIM of all Tx carriers that falls in n bin
n—FD bin index or resulted bin
$f_n$—real frequency of the bin of the PIM The PIM may be produced from multiple carriers transmitted from the single antenna (e.g., case of SISO).

$$PIM = \sum_{p=2}^{P} a_p \left(\sum_{i=1}^{I} T_i\right)^p$$

$a_p$—non linear polynomium term of power p
P—maximum non-linear order
I—no of Tx carrier in all antennas.
i—carrier index For the MIMO case (case of multiple transmitting antennas):

$$PIM = \sum_{p=2}^{P} a_p \sum_{Ant=1}^{NoAntennas} \sum_{i=q}^{I} (T_{Ant,i} IM)^p$$

PIMRX denotes the ensemble of bins that are produced from the bins of all the Tx carriers that falls within the inband in the receiver of the interfered Rx carrier, as follows:
PIMRX=RxFilter (ReceivedPIM).

At 306, synthetic PIM signals are computed from the transmit signals. Each of the synthetic PIM signals is a respective combination of frequency components of the transmit signals. The synthetic PIM signals are computed by combinations of frequency bands selected from the transmission source(s), for example, one or more frequency bands of a first antenna, and one or more frequency bands of a second antenna.

Optionally, the synthetic PIM signals are computed by converting the transmit signals from a time domain to a frequency domain.

Optionally, for each respective receiving frequency domain bin of the received signals of width of the desired signal bandwidth divided by a number of receiving bins that corresponds to one of the receiving antennas denoted NoRxBin, and where PimOrder denotes an order of PIM for mitigation by the PIM mitigation process, the synthetic PIM signals are computed as combinations of transmission frequency domain bins of the transmitted signals with bandwidth of the desired signal divided by a multiple of the number of Rx bins and PIM order denoted by the equation PimOrder*NoRxBin that corresponds to up to PimOrder transmission sources (e.g., antennas) that are predicted to produce PIM in the corresponding frequency domain bins of the received signal.

The term Synthetic Injected PIM (SIP) used herein may be interchanged with the term synthetic PIM signals. The term intermod may sometimes refer to the predicted PIM interference for which the synthetic PIM signals are created for mitigation thereof, as such, the term intermod and SIP and/or synthetic PIM signals may sometimes be interchanged.

The intermods may be produced by converting the transmit signals time samples to frequency domain components and producing synthetically for each specific bin in the receive (Rx) inband all the intermod combination of all transmit outputs frequency domain bins (components) that are expected to produce intermod in that specific receive bins. As seen in the example above described with reference to FIG. 2, for each Rx intermods bin there are 12 synthetic intermods that comprise it.

Optionally, the process of Frequency Domain PIM cancellation is based on processing separately each sub-band component of the single diode generated PIM signal (sometimes referred to herein as PIM signal bin) in the received frequency domain signal utilizing the known pertinent bins of the transmit signals that produce PIM products in a certain Rx bin.

The frequency components of the transmit signals used to generate the respective combination for computing the respective synthetic PIM signal may be selected according to a prediction of producing a respective PIM signal in a corresponding frequency component of the received signals. For example, when the reception source(s) and the transmission source(s) operate simultaneously using same and/or co-located antennas (e.g., as implemented in FDD systems), the PIM product frequency is substantially equal to the frequency of the received signals.

Optionally, the synthetic PIM signals are computed by converting the transmit signals from a time domain to a frequency domain.

Optionally, the received signals (in the frequency domain) are divided into frequency bins. Each bin is selected according to a prediction of including no more than a PIM product generated from a single PIM reflection element. One or more synthetic PIM signals are computed for each group of frequency bins of the transmitted signals corresponding to the respective frequency bin of the received signals. One or more mitigation weights (e.g., as described with reference to 308) are computed for each received frequency bin. The PIM mitigation process (e.g., as described with reference to 312) is computed for each received frequency bin of the reception source (e.g., received antenna) from frequency bins groups of the transmitted signals with plurality of the transmission sources (e.g., antennas). Each synthetic PIM that corresponds to single transmission frequency bin group of a certain length (e.g., denoted N) corresponding to up to N transmission sources (e.g., antenna) out of plurality of all transmission sources (e.g., antennas) produce a single weight for mitigating the respective received PIM in one received source (e.g., antenna) out of the plurality of all receiving sources (e.g., antennas).

For each respective frequency domain bin of the received signals, the synthetic PIM signals are computed as combinations of frequency domain bins of the transmitted signals that are predicted to produce PIM in the corresponding frequency domain bins of the received signals.

When computations are performed in the frequency domain, each frequency bin of the received signals may correspond to two or more frequency bins of two or more synthetic PIM signals. Each frequency bin of the received signals may be overlapped by three or more synthetic PIM signals. The PIM mitigation process may be performed for each respective frequency bin of the received signals using the mitigation weights computed for all of the synthetic PIM signal bins that overlap the respective received signal frequency bin.

Frequency bins of the synthetic PIM signals computed from frequency bins of the transmitted signals overlap completely with the frequency bins of the received signals. Two or more frequency bins of the synthetic PIM signals may overlap the same frequency bin of the received signals. Two or more mitigation weights may be computed (as described with reference to 308) for the same frequency bin of the received signals corresponding to the overlapping synthetic PIM signals, for example, one or more mitigation weights are computed for each overlapping bin of the synthetic PIM signals for the same received signal bin, which are used to clean the respective same received signal bin (as described with reference to 312).

Optionally, the synthetic PIM signals (e.g., one or more, or each) are shifted to an expected center frequency position. The frequency shift is set according to the synthetic PIM signals that have expected center frequency equal to a certain receiving frequency bin center. The amount of frequency shift is set such that the center of bins of the synthetic PIM signal is equal to the center of the receiving bin.

Optionally, the PIM cancellation is performed in the frequency domain. When the frequency of the SIP bin is derived from 2fTx1(bin number)−fTx2(bin number), the bin width of Tx1 may be half of the bin width of Tx2. The resulted SIP bin may be inflated to be double of the bin of Tx2 (2*Fs/N, where Fs denotes the sampling frequency). In summary, when FFT size of Tx2 is N the FFT size of Tx1 is 2N and the FFT size of Rx is N/2.

The frequency distance of two adjacent SIPs (the SIP resolution) is the bin width of Tx2 (Fs/N) while the bandwidth of each SIP is two bin widths of Tx2 (2Fs/N). Because the resolution of the SIP bins is half of the SP bin width, each Rx bin has two overlapping SIPs, and also each SIP overlaps two Rx bins. In order to cancel intermods in Tx bins two SIP types (that originated from adjacent couples) may be used that cancel the two overlapping intermods in a cascade manner. The frequency plan of the Rx may be designed to overlap one SIP type in 100% (or about 100%) and the adjacent SIP type in 50% (or about 50%).

Figure 5:
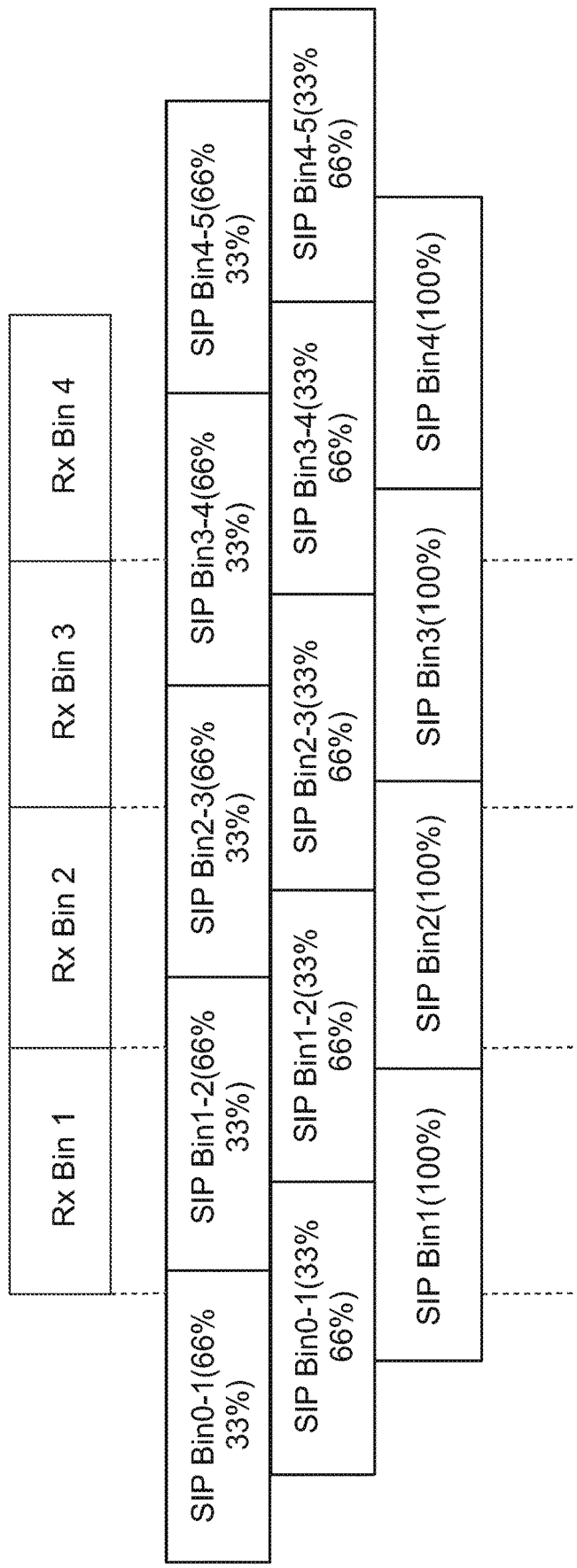
FIG. 5 is a schematic depicting Tx1, Tx2, and SIP bins as a result of adjacent Tx1 and Tx2 bins and corresponding Rx bins, in accordance with some embodiments of the present invention.

Reference is now made to FIG. 5, which is a schematic depicting Tx1, Tx2, and SIP bins as a result of adjacent Tx1 and Tx2 bins and corresponding Rx bins, in accordance with some embodiments of the present invention. Each Rx bin has 5 overlapping SIPs. FIG. 5 depicts that SIP resolution is a third (e.g., about a third) of the Rx bin and the bandwidth is full Rx bin. FIG. 5 depicts the overlap method of SIPS vs Rx bins.

Optionally, when the frequency of the SIP bin is derived from 3 bins multiplication if Tx TxBin1*TxBin2*conj (RxBin3) the SIP bin bandwidth may be inflated to be triplet of the bin of Tx1 and Tx2 and Tx3 assuming the bandwidth of the all three DL bins is equal and is set by the DL filter bank.

It is noted that the 3 bins that produce the SIP may be from a single common antenna and one common DL band, or from a single common antenna and from two bands, or from different antennas and different bands.

In the case of different antennas and different bands, when the Rx filter bank carries N bins, the frequency distance of two adjacent SIPs (the SIP resolution) may be a bin width of Fs/N/3 (in case of third order PIM or Fs/N/M in M order PIM) while the bandwidth of each SIP may be Fs/N. When the resolution of the SIP bins is third (in 3rd order PIM) of the SP bin width, each Rx bin may have five overlapping SIPs, and each SIP may overlap two adjacent Rx bins. In case of 3rd order PIM, in order to cancel intermods in certain Rx bins cancelation weights of all SIPs that overlap the certain Rx bin may be computed. There may be 5 overlapping groups of the SIP, each with common overlap. Each SIP that is not overlapping 100% with an Rx bin may be used for PIM cancelation for an adjacent Rx bin. The two overlapping intermods may be cancelled in a cascade manner. The frequency plan of the Rx may be designed to overlap one SIP type in 33% (about 33%) and the adjacent SIP type in 66% (e.g., about 33%).

Figure 6:
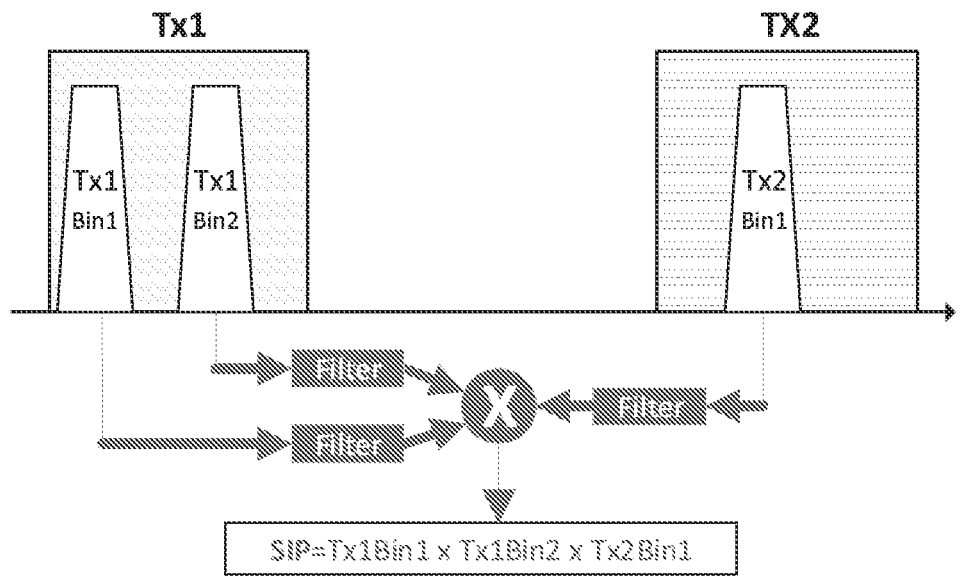
FIG. 6 is a schematic depicting an SIP that is created from two DL bands, two bins from one DL bin and the third one from the other DL band, in accordance with some embodiments of the preset invention.

Reference is now made to FIG. 6, which is a schematic depicting an SIP that is created from two DL bands, two bins from one DL bin and the third one from the other DL band, in accordance with some embodiments of the preset invention. The filters may be in the DL filter bank.

Referring now back to FIG. 3, at 308, mitigation weights for mitigating the synthetic PIM signals are computed.

It is noted that in the case of multiple diodes, the interference PIM signal from each diode is not correlated to any other PIM signal from other diodes. Each diode interference signal may be cancelled with a different set of weights that may be calculated separately. Each diode signal consumes dedicated degree of freedom such that multiple diodes impose requirement for multiple degrees of freedom cancellation system. For example, to try to cancel multiple diodes with adaptive antenna array may require a number antennas that is higher than the number of the parasite diodes in the path.

The weight of each Rx bin may be calculated, for example, using the Direct Inversion (DI) process which is an example of a minimum mean square error (MMSE) algorithm. The DI process calculates weights according to N past two vectors of SIP bin and Rx bin values. One vector is the original Rx bin n–xr(n,t). The second vector is the related SIP intermod SIP(n,t).

A certain SIP(n,t) is a result of bin k of Tx carrier 1 bin of Tx carrier 2 (or carrier 1) and bin m of Tx carrier 3 (or carrier 1 or 2). For example IMkl(n,t)=xt1(k,t)2 xt2(l,t) where n denotes the bin serial number in FD Rx bin vector and t denotes the serial filter bank bin output TD sample of the vector that holds the last and past Rx bin values from pertinent filter bank bin output. 0 denotes the most past (i.e., oldest) sample and N–1 is the most recent (i.e., newest) sample. Wkl(n) denotes the weight value of the will multiply the pertinent SIP. It is noted there may be many SIPs that each receive its own respective cancelation weight(s).

The weight vectors (e.g., all weights) may be calculated in a running window fashion, for example, for every new sample in both vectors (Rx and SIP) the most recent value is added on the account of the oldest sample. Optionally, the weights may be computed every captured N samples. Alternatively or additionally, averaging may be computed with IIR for the nominator and denominator.

The weight of bin n may be calculated as follows:

$$W_k(n, t = N) = \frac{\sum_{t=0}^{t=N-1} r_x(n, t) SIP_k(n, t)'}{\sum_{t=0}^{t=N-1} SIP_k(n, t) SIP_k(n, t)'}$$

At 310, the synthetic PIM signals are aligned to one another in time and/or frequency. The synthetic PIM signals are aligned in time and/or frequency to the received signals.

The alignment may be performed prior to the PIM mitigation process.

Optionally, the timing and/or frequency of the SIP DL signals (e.g., all SIP signals) are aligned among themselves and/or to the Rx signals. The alignment operation may be performed before and/or during the PIM cancellation process.

Optionally, prior to the cancellation processes the sampled DL signals (e.g., all) from the bands (e.g., all) and the Tx MIMO branches (e.g., all) that are during transmission are timing aligned. The alignment may be commenced after measuring mutual delays (e.g., all) and using the measured delays to compensate each signal with its own delay compared to a predefined common signal reference. The compensation may be implemented by measuring each signal to one selected signal that may be designated as a reference signal to the others. The timing alignment may be critical, for example, in case of DL and Rx sampling in the optical domain in split mount base stations implementation between their baseband and the RF unit that may exhibit different timing parameters between the optical and the RF domain.

The timing alignment may be done, for example, by looking to the dependence of the amplitude of correlation between the ensemble of SIPs amplitude (e.g., of common DL signal ingredients) with the uplink signal and the delay between the DL signal ingredients of these SIPs. The common ingredients may vary between bands and MIMO branches until all relevant delays are measured.

Optionally, after performing the timing alignment of the DL signal ingredients that produce the PIM, the uplink signal is aligned with the coming SIPs. The alignment of the uplink signal may be performed, for example, using one or both of the following processes:

By looking at the correlation signal between the ensemble of SIPs and the uplink signal, and time centering the peak of the correlation by inducing the right Rx delay (negative or positive).

By looking at the aggregate PIM rejection performance and with fine delay changes around the coarse delay that exhibit maximum rejection.

Optionally, for the PIM cancellation implementation described herein, the assumption is that all the frequencies plan of the DL and UL signal are set to an accurate level that is satisfied by the cellular technology standard. However in most cases when the computation load of the PIM cancellation system is bounded, any residual frequency error that although may be below the requirement of the standard, may cause an extra requirement for rapid cancellation coefficient update. Calculation of the cancellation coefficient may be performed in order to track the phase change of the residual frequency.

Optionally, the process to compensate the residual frequency error may be similar to the carrier recovery process in modems. In an example implementation, the phase tracking is extracted from averaging of the cancellation coefficient, and is measured and applied back as in common phase-locked loop (PLL) to NCO (numerical control oscillator) of either of the one that demodulates the Rx to baseband and/or the NCO that demodulates one of the DL band signals to baseband.

At 312, a PIM mitigation process is performed on the received signals with the mitigation weights to generate clean signals.

When PIM products in the received signals are created from multiple PIM reflection elements, the PIM mitigation process is performed on the received signal when a frequency bandwidth of the received signals is lower enough compared to an inverse of maximum difference in delay difference between a closest and a furthest of the PIM reflection elements.

The PIM mitigation process may be done, for example, by MMSE for each received signal bins against the non-linear formula of the order of the related bins of the transmit signals.

Figure 7:
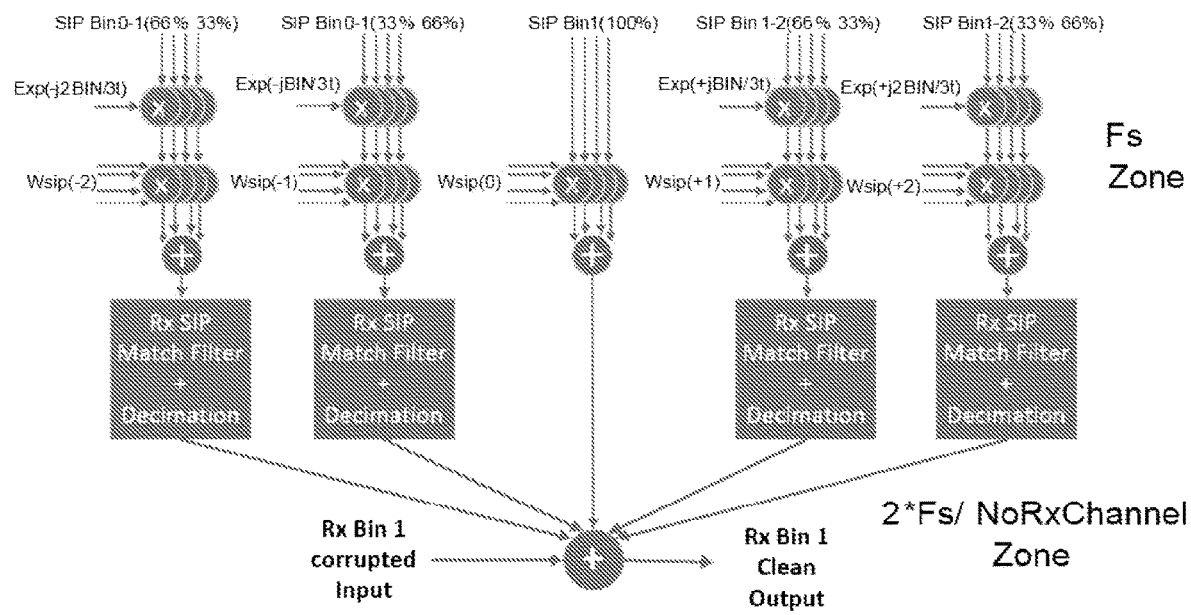
FIG. 7 is a schematic depicting a process for cancellation of the two overlapping intermod (PIM) bins and SIPS that are produced to cancel them, in accordance with some embodiments of the present invention.

Reference is now made to FIG. 7, which is a schematic depicting a process for cancellation of the two overlapping intermod (PIM) bins and SIPS that are produced to cancel them, in accordance with some embodiments of the present invention. The process of FIG. 7 may be implemented by and/or combined with the method described with reference to FIG. 3, and/or by components of system 400 described with reference to FIG. 4, and/or with other methods and/or processes described herein. Each cancelation branch incorporates a match filter that matches the shape of the SIP as expected in the Rx (e.g., received by Rx antenna). As shown, there may be 5 SIP bins for each Rx bin. The memory matrix holds the 5 groups of SIP bin couples for each Rx bin. The memory matrix issues 5 groups of bin for each Rx one 100% (e.g., about 100%) overlapping with Rx bin and other 33% (e.g., about 33%) and 66% (e.g., about 66%) intermod group. The shift is done with NCO and since the bin is narrow than the Nyquist requirement there may be decimation in order to reduce the complexity calculation.

The SIP may be calculated from multiple of 3 DL bins, for example, obtained from common DL band and/or from separate DL bands, and/or from common DL antenna branch and/or separate DL bins.

Referring now back to FIG. 3, at 314, the clean signals are provided. The clean signals may be provide to the wireless device (e.g., receiver of the wireless network), for example, for forwarding to the network.

At 316, one or more parameters of the PIM interference are computed using the synthetic PIM signals and provided, for example, presented on a display to a user, stored in a memory, and/or forwarded to another computing device (e.g., administrative server).

Exemplary parameters of the PIM interference that may be computed using the synthetic PIM signals include: the order of PIM interference, frequency of the PIM generating transmitter, and a certain emitting antenna generating PIM in a certain receiver interfered antenna.

At 318, one or more features described with reference to 302-316 may be iterated, for example, for continuous PIM mitigation for continuously received signals.

Optionally, the performance of the PIM mitigation device is evaluated, for example, to determine whether PIM is successfully removed from the received signals. The level of PIM interference remaining in the cleaned signals may be monitored.

One or more components of the wireless device and/or one or more parameters of the PIM mitigation device may be adapted, optionally according to the monitoring, for example, when the PIM interference is not sufficiently removed (e.g., according to a requirement), for example, additional receiving and/or transmitting antennas may be added to increase antenna diversity for example to enable removal of PIM interference from a higher number of PIM reflection elements than the current number of receiving antennas. In another example, parameters defining the process for computation of the synthetic PIM signals may be adapted to improve matching of the synthetic PIM signals to the real PIM interference to improve cleaning of the received signals.

Figure 8:
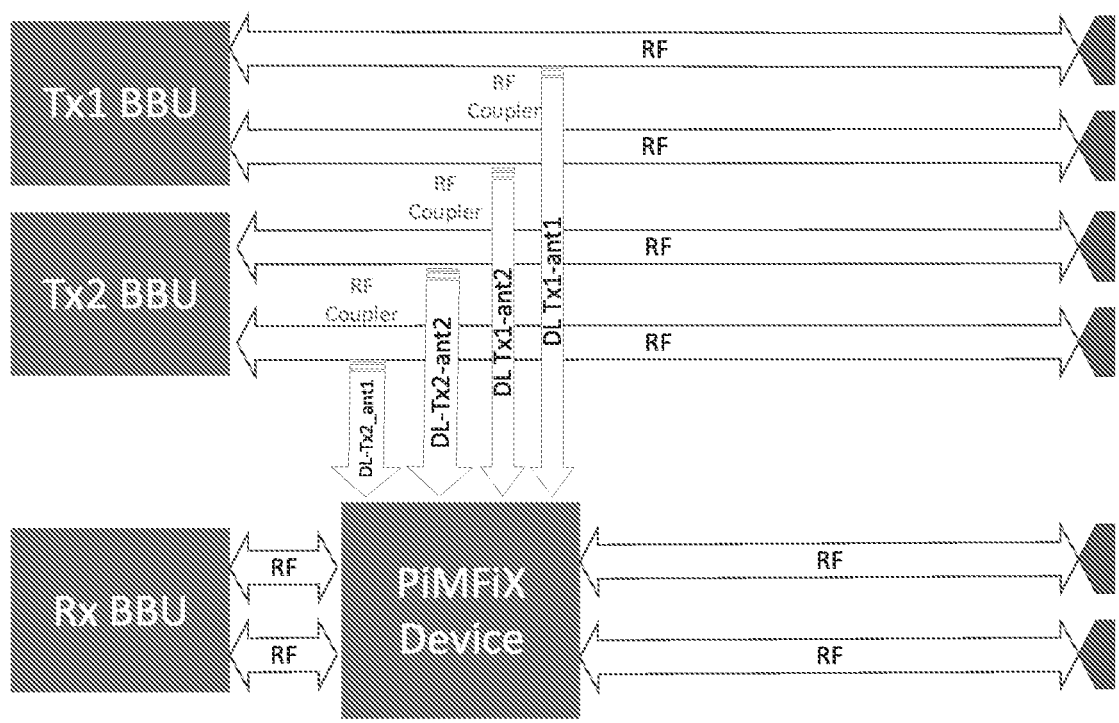
FIG. 8 is a schematic of an exemplary process for performing PIM cancellation of RF signals, in accordance with some embodiments of the present invention.

Reference is now made to FIG. 8, which is a schematic of an exemplary process for performing PIM cancellation of RF signals, in accordance with some embodiments of the present invention. The process of FIG. 8 may be implemented by and/or combined with the method described with reference to FIG. 3, and/or by components of system 400 described with reference to FIG. 4, and/or with other methods and/or processes described herein. For cancellation for RF signals, the PIM cancellation process may be performed in front of the RF circuitry of the receiver. The Tx and Rx signals may be sampled from the RF outputs and converted to digital to compute the synthetic PIM signals that are used for the PIM cancelation process. The weighted SIP signal is added to the digitized RF-Rx signal to get PIM free digital Rx signal Interface that is converted back to RF and sent to the RF-Rx input of the receiver.

Figure 9:
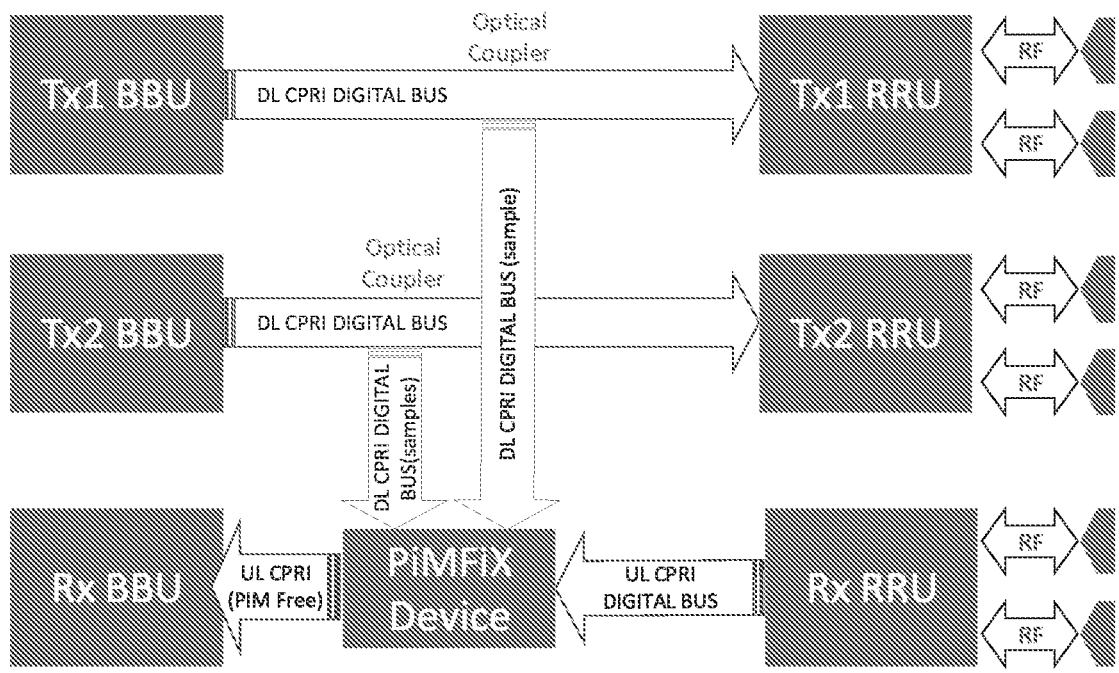
FIG. 9 is a schematic of an exemplary process for performing PIM cancellation of digital baseband signals, in accordance with some embodiments of the present invention.

Reference is now made to FIG. 9, which is a schematic of an exemplary process for performing PIM cancellation of digital baseband signals, in accordance with some embodiments of the present invention. The process of FIG. 9 may be implemented by and/or combined with the method described with reference to FIG. 3, and/or by components of system 400 described with reference to FIG. 4, and/or with other methods and/or processes described herein. A network architecture for which digital baseband cancellation is performed is comprised of one or more baseband units (BBU) that process the Tx and Rx signals digitally. The Tx and Rx digital baseband signals input and output are respectively sent and received to one or more remote radio units (RRU) digitally through fiber optic cables or other digital media. There are several standards for such baseband communication such as CPRI or OBSAI.

Figure 10:
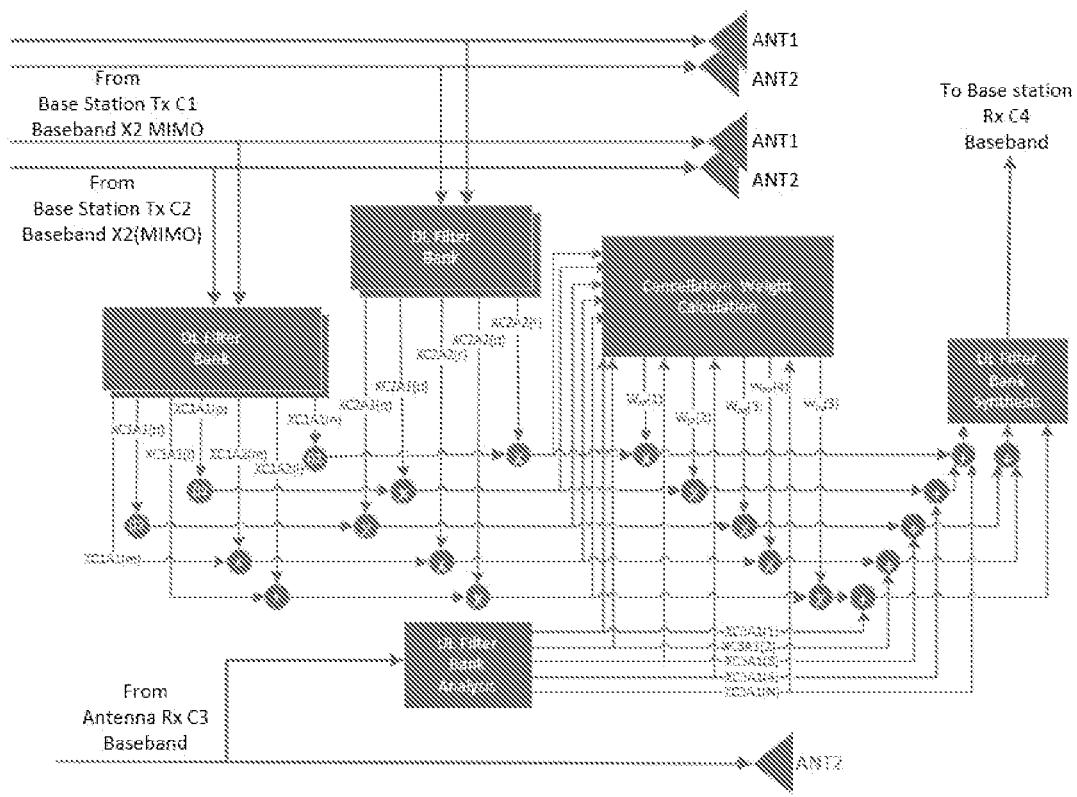
FIG. 10 is a schematic of an exemplary process for digital PIM cancellation, in accordance with some embodiments of the present invention.

Reference is now made to FIG. 10, which is a schematic of an exemplary process for digital PIM cancellation, in accordance with some embodiments of the present invention. The process of FIG. 10 may be implemented by and/or combined with the method described with reference to FIG. 3, and/or by components of system 400 described with reference to FIG. 4, and/or with other methods and/or processes described herein. The process for digital PIM cancellation method depicted in FIG. 10 may be implemented for one or more PIM cancellation architectures described herein, for example, the process for PIM cancellation of RF signals depicted with reference to FIG. 8 and/or the process for PIM cancellation of baseband signals described with reference to FIG. 9.

The four Tx signals from the two transmitters multiplied by two MIMO antennas are sampled and filtered in the frequency domain by narrow band filter bank that may be implemented in one or more processes, for example, including FFT as a part of Window Over Lap and add (WOLA) filter bank. All four filter bank bin groups are buffered. In addition, digital baseband signal that enters from single Rx antenna of third LTE carrier (carrier 3) is also sampled and is converted to FD with additional filter bank (e.g., may be WOLA filter bank as in the DL implementation). The bins (optionally all bins) of the Tx intermods that are resulted from the Tx bins of both Tx carriers may overlap completely with the Rx carrier bins. In order to implement this case, the center frequency of the sampled Rx baseband signal may be set with some shift offset compared to the center frequency of the RF Rx carrier. This offset may be implemented when the intermod bins FD location depends on both Tx carrier center frequency and FFT size of the filter bank bin and the FD location of the Rx bins depends on Rx carrier center frequency and the filter bank size. In case there are several Rx antennas (Rx MIMO), a separate cancelation circuit may be implemented for each Rx input in order to cancel the PIM separately for each Rx antenna. As depicted in FIG. 10, there may be several Tx intermods that overlap the same Rx bin. In order to cancel these overlapping intermods, several weights may be calculated and to set for each Rx bin that have several overlapping Tx intermod bins and as a result corresponding SIPs. The weight that corresponds to bin m in Tx1 carrier and bin n in Tx2 carrier is referred to as SIPmn and as Wmn. It is noted that the WOLA filter bank is shown as an example, however other suitable filter bank implementation may be used.

Figure 11:
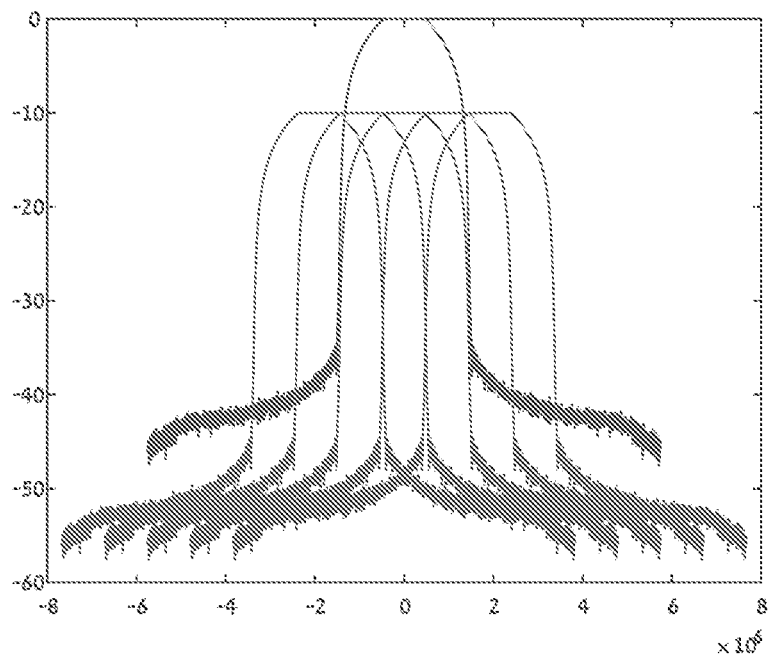
FIG. 11 is a graph depicting the UL bin and 5 SIPs that overlap it, in accordance with some embodiments of the present invention.

Reference is now made to FIG. 11, which is a graph depicting the UL bin and 5 SIPs that overlap it, in accordance with some embodiments of the present invention.

Optionally, based on the frequency process described herein (e.g., as described with reference to FIG. 5), in order to cancel the first 100% (or about 100%) overlapping intermod the first SIP type is used directly after Rx FFT and the two other adjacent SIP type are used after shifting the Rx FFT bin by a third bin through returning to TD by executing IFFT multiply by half bin frequency shift NCO and back to FD with additional FFT.

Figure 12:
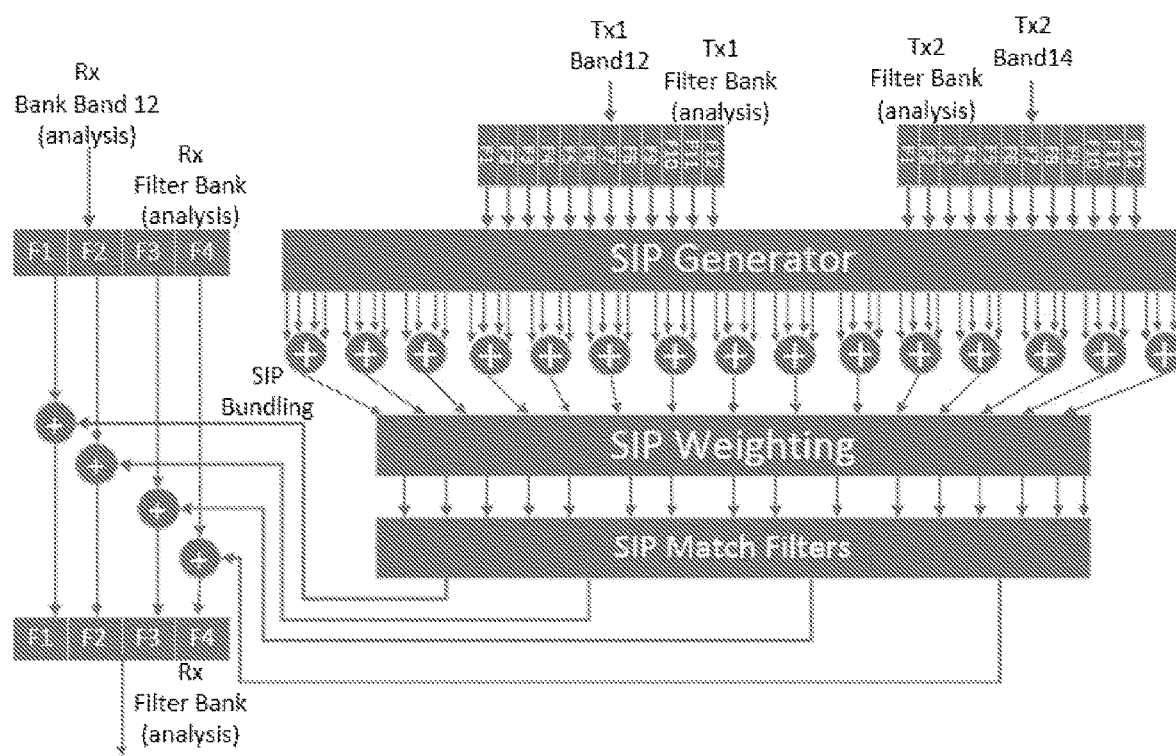
FIG. 12 is a schematic depicting the PIM cancellation process for 4 UL bin and 12 DL bins, in accordance with some embodiments of the present invention.

Reference is now made to FIG. 12, which is a schematic depicting the PIM cancellation process (e.g., implemented by the PIM mitigation component) for 4 UL bin and 12 DL bins, in accordance with some embodiments of the present invention. The process of FIG. 12 may be implemented by and/or combined with the method described with reference to FIG. 3, and/or by components of system 400 described with reference to FIG. 4, and/or with other methods and/or processes described herein. The SIPs are generated out of two DL carriers Tx1 and Tx2 (e.g., for common or different antenna). Each SIP is shifted by NCO according its expected center frequency position and is assigned to the UL bins (neighboring two that are targeted to cancel). Then each SIP is assigned its own cancellation weight(s) (e.g., calculated by separate component). After weighting the SIPs they are added to the certain Rx bin.

Figure 13:
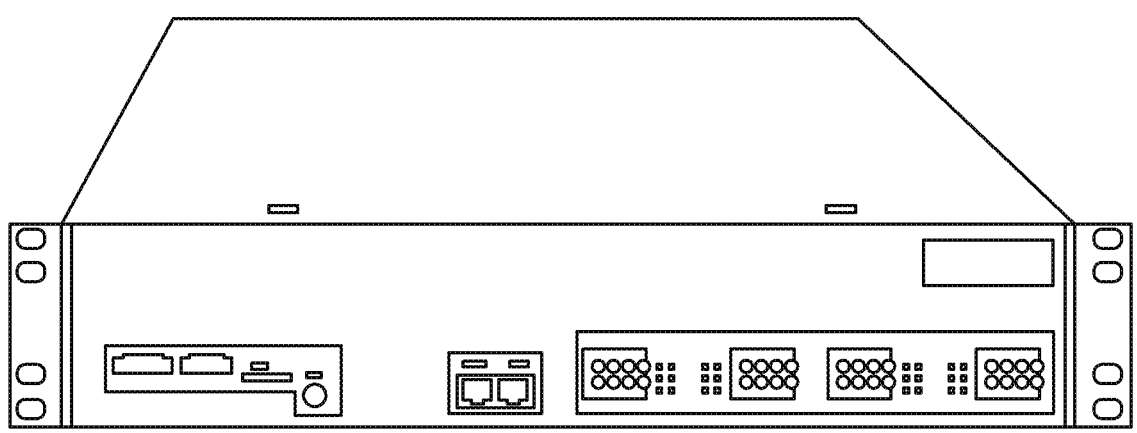
FIG. 13 is a schematic of an exemplary implementation of the PIM mitigation device, in accordance with some embodiments of the present invention.

Reference is now made to FIG. 13, which is a schematic of an exemplary implementation of the PIM mitigation device, in accordance with some embodiments of the present invention. The exemplary implementation may include one or more of the following features:

PIM protection of up to eight LTE radios (RRUs)
    Up to 25 dB of tangible PIM cancelation
    Restoring pre-PIM noise-floor
    Centralized processing architecture
    Utilizing downlink transmission components
Macro, DAS and C-RAN applications
Simple and quick installation
    2U rackmount front-access enclosure
    Seamlessly installed between RRU and BBU
    Zero e-NodeB configuration requirements
    Embedded Optical Line Protection
Local and remote control and monitoring options via UBi-EMS and UBiView:
    Configuration and monitoring
    View of collected signals and spectrum
Significant improvement of voice and data KPIs and regain of optimal downlink transmit power The following table provides exemplary technical specifications for the PIM mitigation device:

| ELECTRICAL SPECIFICATIONS | |
|---|---|
| CPRI | |
| Rate | 3, 5 and 7 (optional) |
| Channel | 5/10/15/20 MHz LTE Channels. Up to |
| Configuration | 4 Channels per Radio |
| Gain | 0 dB |
| PIM Cancellation | Up to 25 dB or PIM SNR |
| Total Delay | <24 μsec |
| OLP (Optical Line Protection) | |
| Optical Bypass Mode Loss | 3 dB typical |
| Switching time | <10 ms |
| Interface & Protocol | |
| Interface | 32 × LC/PC CPRI Single Mode Fiber Optic Connectors RJ45 Ethernet (100 Base-T) Cellular Modem |
| Max. number of Radios | Up to 8 (RRU/BBU Pairs) |
| Remote Control Capability | HTTP Or SNMPv2c |
| Power | |
| Input power supply voltage | DC: −48 V/Max. 10 A (36 to 60 VDC) |
| | AC: 90 VAC to 264 VAC/Typ 6 A@115 VAC, Typ 3 A@230 VAC |
| Power Consumption | idle state < 200 W, Max < 300 W |
| MECHANICAL SPECIFICATIONS | |
| Dimensions L × W × H mm(in) | 370 mm × 430 mm × 88 mm (14.5" × 17.0" × 3.5") |
| Weight | <10 Kg (22 lbs) |
| ENVIRONMENTAL SPECIFICATIONS | |
| Temperature | 0 to +50° C. |
| Ingress | IP 20, indoor unit |

Various embodiments, implementations, and aspects of the systems, apparatus, method and/or code instructions as delineated hereinabove and as claimed in the claims section below find experimental support in the following examples.

EXAMPLES

Reference is now made to the following examples, which together with the above descriptions illustrate some embodiments and/or implementations of the systems, apparatus, method and/or code instructions described herein in a non-limiting fashion.

A known PIM case is described. The example PIM case includes two 3GPP bands band 17 DL (734-744 MHz) with band 14 DL (758-768 MHz) to band 17 UL (704-714 MHz). The example PIM case scenario produces 3rd order PIM (and other non-even order).

Figure 14:
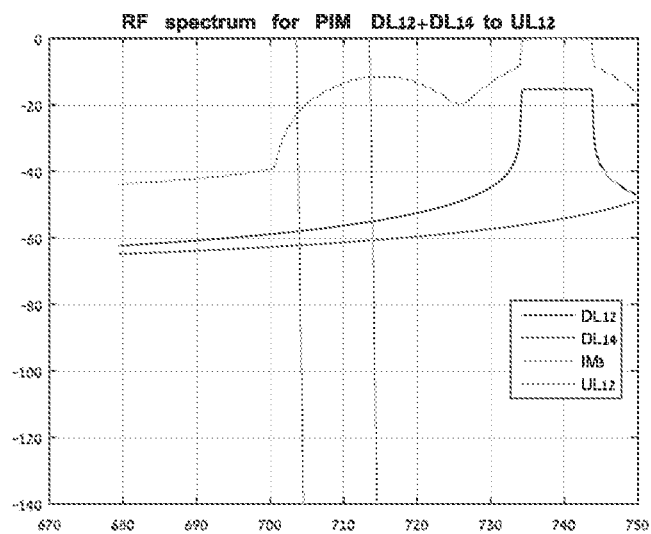
FIG. 14 is a graph depicting the spectral picture of the 3rd order PIM of ban 17+14 of the example case, in accordance with some embodiments of the present invention.

Reference is now made to FIG. 14, which is a graph depicting the spectral picture of the $3^{rd}$ order PIM of band 17+14 of the example case, in accordance with some embodiments of the present invention.

Figure 15:
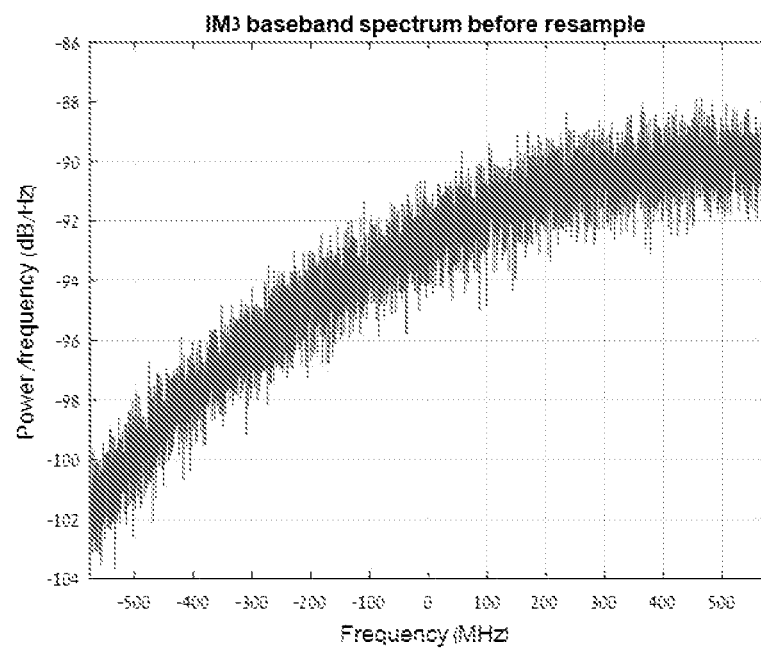
FIG. 15 is a graph depicting the spectrum of the PIM in UL band 17 for the example PIM case and the expected PIM in band 14 UL, in accordance with some embodiments of the present invention.

Reference is now made to FIG. 15, which is a graph depicting the spectrum of the PIM in UL band 17 for the example PIM case and the expected PIM in band 14 UL, in accordance with some embodiments of the present invention.

Each SIPs in the example PIM case is created from two DL bins of band 17 and one bin of band 14. The number of SIPs is directly derived from the number of DL bins. In the described implementation the DL bins bandwidth is one third of the UL bin.

Figure 16:
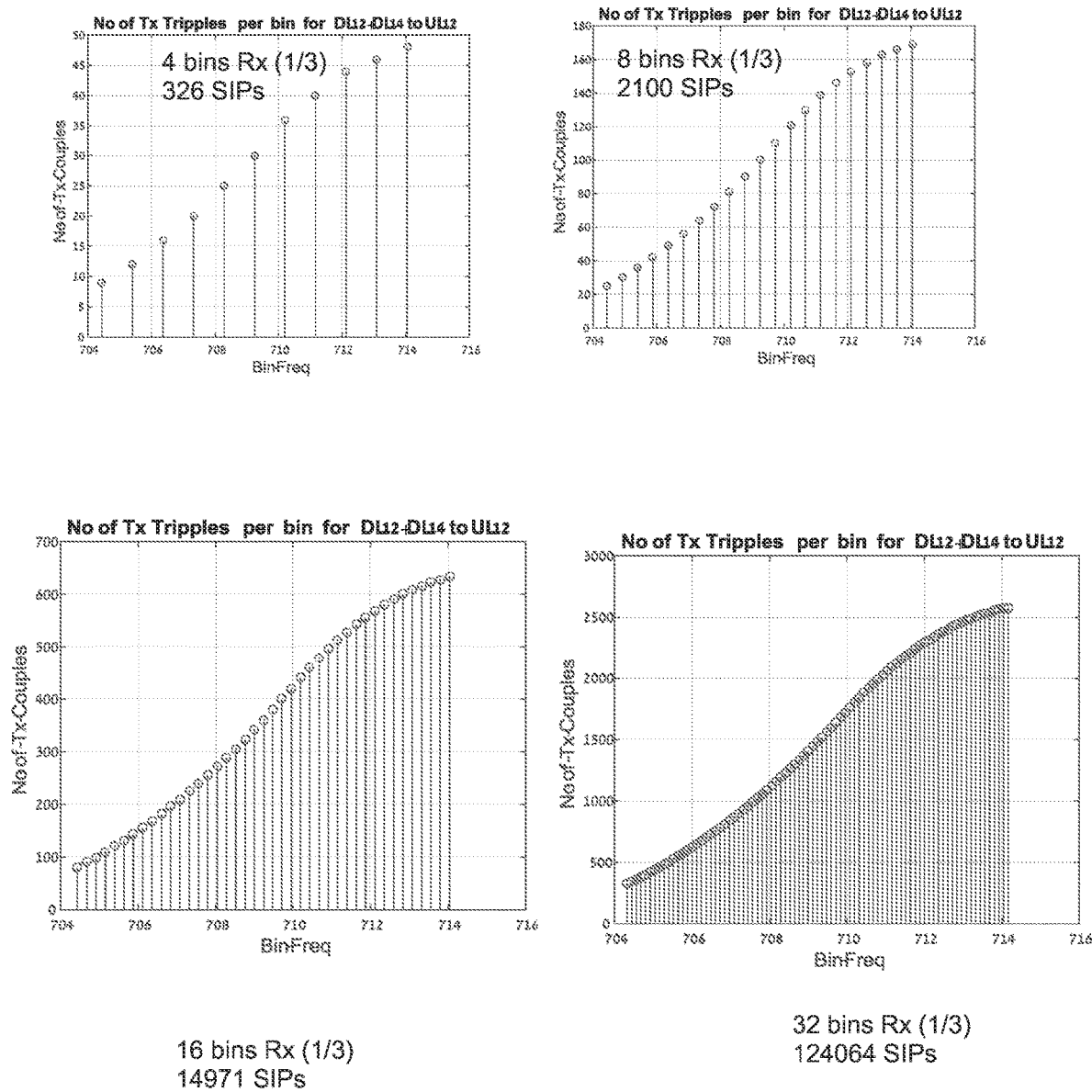
FIG. 16 includes graphs depicting the number of SIPs for several numbers of DL bins, in accordance with some embodiments of the present invention.

Reference is now made to FIG. 16, which includes graphs depicting the number of SIPs for several numbers of DL bins, in accordance with some embodiments of the present invention. FIG. 16 is for the case of SISO number of SIPs for 4-32 UL bins.

For the DL MIMO case, the number of SIPs are multiplied by the following: (NumberSISO_SIPs)(NoOfDLAntennas) 3.

For the case of Rx MIMO, the same sIPS are injected for each Rx antenna bin with different weight assigned to each DL MIMO SIP.

The 21/7 bin case is now described. It is noted that 21 and 4 bins are the number of bin divisions throughout the spectrum from 0 (DC) to Fs (the sampling frequency). Practically, when band 17-DL, band 14-DL, and band 17-UL are bounded to 10 Mega Hertz (MHz), 15 DL filters and 5 UL filters are sufficient in DL and UL filter banks respectively.

Figure 17:
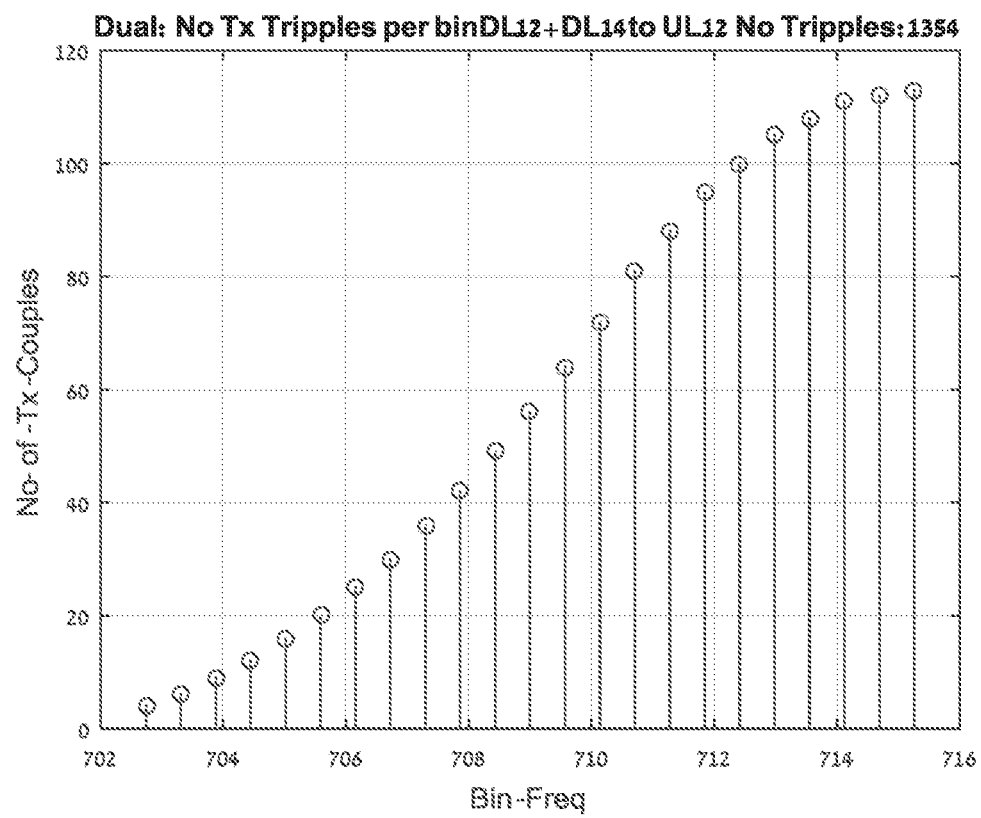
FIG. 17 is a graph depicting the number of SIPs for each UL bin for the 7 UL bin case, in accordance with some embodiments of the present invention.

Reference is now made to FIG. 17, which is a graph depicting the number of SIPs for each UL bin for the 7 UL bin case, in accordance with some embodiments of the present invention. SIP number for band 17+14 PIM on band 17 7UL+21DL bins filter bank. The SISO number of SIPs is 1354. With MIMO 2×2 there are 1354*8=10832 SIPs. The SIPs exhibit 2*10832=21664 weighted injections.

In order to achieve SIP bins alignment of bin 17+14 DL to Rx bin alignment of UL 17 (e.g., as described with reference to FIG. 5) a shift of the center frequency of the filter bank of DL 14 is performed i.e., the same filter bank that creates the DL 13 bins for the SIPs. For example, In case of 21 bins DL and 7 bins UL the frequency shift is 148.5714 kilo Hertz (KHz).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant receiving and transmission sources will be developed and the scope of the term receiving and transmission sources is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A passive intermodulation (PIM) mitigation module for mitigating PIM within a receiver of a wireless network, the PIM mitigation module comprising:
   at least one processor executing a code for:
      receiving transmit signals transmitted by at least one transmission source;
      receiving received signals received by at least one reception source;
      computing a plurality of synthetic PIM signals from the transmit signals, wherein each of the plurality of synthetic PIM signals is a respective combination of a plurality of frequency components of the transmit signals;
      computing a plurality of mitigation weights for mitigating the plurality of synthetic PIM signals; and
      performing a PIM mitigation process on the received signals with the plurality of mitigation weights to generate clean signals to provide to the receiver;
      wherein the plurality of synthetic PIM signals are computed by combinations of frequency bands selected from a plurality of the at least one transmission source denoting a predicted reflection of the transmit signals off at least one non-linear PIM reflection element that is received by the at least one reception source.

2. The PIM mitigation module of claim 1, wherein the plurality of frequency components of the transmit signals used to generate the respective combination are predicted to produce a respective PIM signal in a corresponding frequency component of the received signals.

3. The PIM mitigation module of claim 1, wherein the received signals are divided into a plurality of frequency bins each predicted to include no more than a PIM product generated from a single PIM reflection element, at least one synthetic PIM signal is computed for each group of frequency bins of the transmitted signals corresponding to the respective frequency bin of the received signals, at least one mitigation weight is computed for each received frequency bin, and the PIM mitigation process is computed for each received frequency bin of a plurality of reception sources from frequency bins groups of the transmitted signals with a plurality of transmission sources.

4. The PIM mitigation module of claim 3, wherein the plurality of synthetic PIM signals are computed by converting the transmit signals from a time domain to a frequency domain.

5. The PIM mitigation module of claim 1, further comprising shifting each of the plurality of synthetic PIM signals to an expected center frequency position, wherein the frequency shift is set according to the synthetic PIM signals that have expected center frequency equal to a certain receiving frequency bin center, the amount of frequency shift is set such that the center of bins of the synthetic PIM signal is equal to the center of the receiving bin.

6. The PIM mitigation module of claim 1, wherein the received signals include PIM products created from the transmit signals from a plurality of transmission sources.

7. The PIM mitigation module of claim 1, wherein PIM products in the received signals are created from a plurality of PIM reflection elements, and the PIM mitigation process is performed on the received signals when a frequency bandwidth of the received signals is lower enough compared to an inverse of maximum difference in delay difference between a closest and a furthest of the plurality of PIM reflection elements.

8. The PIM mitigation module of claim 1, further comprising, prior to the performing the PIM mitigation process, aligning time and frequency of the synthetic PIM signals and relative to the received signals.

9. The PIM mitigation module of claim 1, wherein the at least one reception source and the at least one transmission source operate simultaneously using same and/or co-located antennas, and a PIM product frequency is equal to the frequency of the received signals.

10. The PIM mitigation module of claim 1, wherein the received signals include PIM created from components of hardware of the at least one reception source.

11. The PIM mitigation module of claim 1, wherein the received signals include PIM created from a nonlinear reflecting object in a transmission path of the transmit signals that is reflected to a plurality of reception sources and included in the received signals.

12. The PIM mitigation module of claim 1, further comprising computing and providing an indication of at least one member of the group consisting of: order of PIM interference, frequency of the PIM generating transmitter, and a certain emitting antenna generating PIM in a certain receiver interfered antenna.

13. The PIM mitigation module of claim 1, wherein the PIM in the received signals is created from a plurality of carriers transmitted from a single antenna.

14. The PIM mitigation module of claim 1, wherein a third order PIM is included in the received signals when two transmit carriers and two multiple-input and multiple-output (MIMO) antennas are implemented.

15. The PIM mitigation module of claim 1, wherein frequency bins of the plurality of synthetic PIM signals computed from frequency bins of the transmitted signals overlap completely with the frequency bins of the received signals.

16. The PIM mitigation module of claim 15, wherein a plurality of frequency bins of the plurality of synthetic PIM signals overlap a same frequency bin of the received signals.

17. The PIM mitigation module of claim 16, wherein at least two mitigation weights are computed for the same frequency bin of the received signals corresponding to the overlapping plurality of synthetic PIM signals.

18. A method of mitigating passive intermodulation (PIM) within a receiver of a wireless network, comprising:
   receiving transmit signals transmitted by at least one transmission source;
   receiving received signals received by at least one reception source;
   computing a plurality of synthetic PIM signals from the transmit signals, wherein each of the plurality of synthetic PIM signals is a respective combination of a plurality of frequency components of the transmit signals;

computing a plurality of mitigation weights for mitigating the plurality of synthetic PIM signals; and performing a PIM mitigation process on the received signals with the plurality of mitigation weights to generate clean signals to provide to the receiver;

wherein the plurality of synthetic PIM signals are computed by combinations of frequency bands selected from a plurality of the at least one transmission source denoting a predicted reflection of the transmit signals off at least one non-linear PIM reflection element that is received by the at least one reception source.

19. A computer program product for mitigating passive intermodulation (PIM) within a receiver of a wireless network, comprising:

a non-transitory memory having stored thereon a code for execution by at least one hardware processor adapted to execute the code for:

receiving transmit signals transmitted by at least one transmission source;

receiving received signals received by at least one reception source;

computing a plurality of synthetic PIM signals from the transmit signals, wherein each of the plurality of synthetic PIM signals is a respective combination of a plurality of frequency components of the transmit signals;

computing a plurality of mitigation weights for mitigating the plurality of synthetic PIM signals; and performing a PIM mitigation process on the received signals with the plurality of mitigation weights to generate clean signals to provide to the receiver;

wherein the plurality of synthetic PIM signals are computed by combinations of frequency bands selected from a plurality of the at least one transmission source denoting a predicted reflection of the transmit signals off at least one non-linear PIM reflection element that is received by the at least one reception source.

* * * * *